US012260780B2

(12) United States Patent
Yadav et al.

(10) Patent No.: US 12,260,780 B2
(45) Date of Patent: Mar. 25, 2025

(54) SUBJECT COMPREHENSION EVALUATION IN AN ONLINE HANDS-ON LEARNING PLATFORM

(71) Applicant: COURSERA, INC., Mountain View, CA (US)

(72) Inventors: Namit Yadav, Hillsborough, CA (US); Nedyalko Konstantinov Dyakov, Sofia (BG); Nadezhda Nikolova Petrova, Lovech (BG); Sergey Andreevich Shcherbina, Perm (RU); Ivaylo Petkov Tsankov, Gabrovo (BG)

(*) Notice: Subject to any disclaimer, the term of this patent is extended or adjusted under 35 U.S.C. 154(b) by 151 days.

(21) Appl. No.: 17/451,072

(22) Filed: Oct. 15, 2021

(65) Prior Publication Data

US 2022/0122478 A1    Apr. 21, 2022

Related U.S. Application Data

(60) Provisional application No. 63/198,402, filed on Oct. 15, 2020.

(51) Int. Cl.
*G09B 7/00* (2006.01)
*G09B 19/00* (2006.01)

(52) U.S. Cl.
CPC .......... *G09B 7/00* (2013.01); *G09B 19/0053* (2013.01)

(58) Field of Classification Search
CPC ... G09B 5/00; G09B 7/00; G09B 7/04; G09B 7/06; G09B 5/02; G09B 5/06
See application file for complete search history.

(56) References Cited

U.S. PATENT DOCUMENTS

| | | | |
|---|---|---|---|
| 2013/0031208 A1* | 1/2013 | Linton | G09B 7/02 709/217 |
| 2013/0212521 A1* | 8/2013 | Fedoseyeva | G06Q 10/00 715/781 |
| 2014/0377733 A1* | 12/2014 | Olsen, Jr. | G09B 7/07 434/350 |

\* cited by examiner

*Primary Examiner* — Robert J Utama

(57) ABSTRACT

Described systems and techniques utilize pre-configured cloud workspaces, obtained from cloud providers and configured by/for instructors, that may be deployed to learners with all necessary software and other features included therewith, and that are managed on behalf of the learners and instructors by a hands-on, online learning platform provider. The online learning platform provider may provide many different types of learning content, and may enable a corresponding variety of types of hands-on learning experiences to a large number of learners, and may evaluate such hands-on learning experiences in an accurate, automated, and timely fashion.

22 Claims, 31 Drawing Sheets

SUBJECT COMPREHENSION EVALUATION IN AN ONLINE HANDS-ON LEARNING PLATFORM

CROSS-REFERENCE TO RELATED APPLICATION

This application claims priority to U.S. Provisional Application No. 63/198,402, filed on Oct. 15, 2020, and entitled "SUBJECT COMPREHENSION EVALUATION IN AN ONLINE HANDS-ON LEARNING PLATFORM," the disclosure of which is incorporated by reference herein in its entirety.

TECHNICAL FIELD

This description relates to online learning systems.

BACKGROUND

Online learning platforms provide network-based educational opportunities for users, which would otherwise be inconvenient or unavailable for those users. As an addition to the benefits of the online learning platforms, the hands-on learning experience allows users to acquire skills through an active-learning approach. For example, a hands-on learning experience may include learning to write functional code.

Both traditional and hands-on learning experiences need a way to evaluate the learners' subject comprehension. With the traditional learning experience, evaluation is often performed using conventional methods, such as quizzes, tests, and written assignments. For hands-on learning experiences in an online learning platform, however, it is not feasible to evaluate the hands-on abilities of the learners using conventional techniques.

For example, online learning platforms are often provided to thousands or millions of learners, using the Internet or other networks. Hands-on learning typically requires access to, or use of, corresponding types of software, which may not be available in a standardized or practical way for all of the learners to install and use. Even for learners with access to required software, it may be difficult or impossible for instructors or other administrators to oversee and manage installation and use of such software by all such learners, particularly if troubleshooting is required.

It is also not feasible, using conventional techniques, for an online learning platform provider to attempt to provide all such desired resources. For example, an online learning platform provider may attempt to provide remote access to required software, e.g., by using servers that may be accessed by the learners through a local browser. However, such an approach may be prohibitively expensive, and/or generally difficult to scale to provide all of the various types of hands-on learning experiences that large numbers of learners may wish to access.

Moreover, even if necessary resources were provided to learners, the nature of hands-on learning experiences implies that the solutions provided by the learners may vary widely. Consequently, particularly in the aggregate, it may be difficult or impossible for conventional solutions to accurately and meaningfully evaluate such hands-on learning experiences in a timely fashion for all of the learners.

SUMMARY

According to one general aspect, a computer program product may be tangibly embodied on a non-transitory computer-readable storage medium and may include instructions. When executed by at least one computing device, the instructions may be configured to cause the at least one computing device to provide a graphical user interface configured to access and display a cloud workspace from a cloud provider together with rendered content from a learning platform, the rendered content instructing a task to be performed in the cloud workspace using hardware resources of the at least one computing device. When executed by at least one computing device, the instructions may be configured to cause the at least one computing device to record, within the cloud workspace, input data streams corresponding to the use of the hardware resources while performing the task, synchronized with task data of the task being performed within the cloud workspace. When executed by at least one computing device, the instructions may be configured to cause the at least one computing device to provide the recorded streams and the task data to an autograder configured to compare the recorded streams and task data with a solution to the task obtained from the learning platform, to thereby obtain feedback regarding correctness of the task performed relative to the solution. When executed by at least one computing device, the instructions may be configured to cause the at least one computing device to render the feedback within the graphical user interface.

According to other general aspects, a computer-implemented method may perform the instructions of the computer program product. According to other general aspects, a system may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

DETAILED DESCRIPTION

Figure 1:
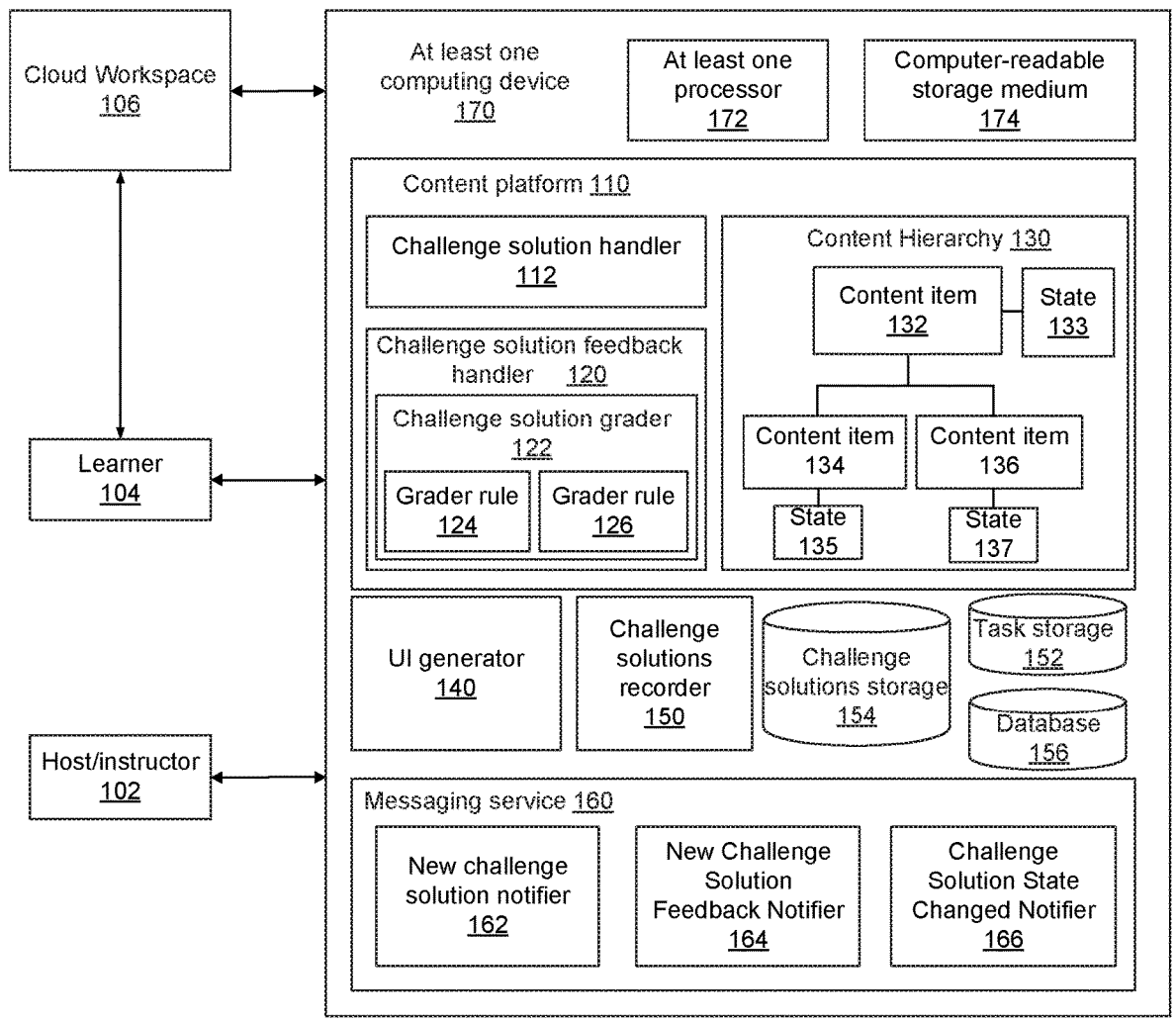
FIG. 1 is a block diagram of a system for evaluating learners' subject comprehension using challenges.

To address the above and other difficulties associated with providing hands-on learning experiences for learners using an online learning platform, techniques described herein utilize pre-configured cloud workspaces, obtained from cloud providers and configured by/for instructors, that are deployed to the learners with all necessary software and other features included therewith, and that are managed on behalf of the learners and instructors by a hands-on, online learning platform provider. The online learning platform provider may provide many different types of learning content, and may enable a corresponding variety of types of hands-on learning experiences to a large number of learners, and may evaluate such hands-on learning experiences in an accurate, automated, and timely fashion.

Conventional online learning platform providers typically provide access to instructional content, perhaps facilitated by live or recorded instructors. For example, such online learning platform providers may provide third-party content to learners, such as instructional videos. Online learning platform providers may also provider internally-generated instructional content, e.g., by providing instructors with an ability to author instructional content in formats that are compatible with delivery modalities of the online learning platform provider. Online learning platform providers may provide and enable many other features and functions, such as providing tests/quizzes to learners (which may then be graded by instructors or others in conventional manners), tracking progress of learners through a course, and managing enrollment and other administrative duties. In short, conventional online learning platform providers may attempt to emulate classroom experiences in which learners observe an instructor of a course, and then are tested with respect to the completeness and accuracy of their observations.

As referenced above, however, it is difficult for conventional online learning platform providers to enable hands-on learning in a practical manner. As used herein, hands-on learning generally refers to learning that requires a learner to have access to, and use, software that provides specific functionality, so that the learner may learn to use that functionality to obtain desired, specified results.

For example, a user may wish to learn to write code in a specific programming language. The programming language may require a specific type of development environment, compiler, or other software. It is possible for an instructor to record a video, or broadcast a lecture, instructing learners with respect to writing code in the programming language, with an expectation that the learners will obtain all necessary software to use the programming language.

In practice, however, learners who, by definition, are novices with respect to the programming language, cannot be expected to easily or correctly obtain and successfully install such required software. Further, the many learners who may wish to learn the programming language may each experience different types or degrees of difficulty in obtaining and installing the required software, thereby multiplying the difficulties an instructor or other administrator may experience in ensuring that the learners are able to proceed.

Additionally, conventional coursework of learners is typically evaluated primarily or entirely on a final work product of the learners. For example, quizzes or tests may be checked for correctly-selected or correctly-provided answers, and written essays or reports may be evaluated for content, grammar, style, and other aspects.

In contrast, hands-on learning experiences occur during, and may be evaluated over, a period of time during which the learner is working. Subsequent evaluation may not be entirely dependent upon a result or outcome of the experience, and the result or outcome may not be binary or otherwise easily or objectively gradable.

For example, a learner writing a program may obtain a desired result in multiple possible ways. The learner may write blocks of code, receive an error, and revise or erase some of the written code. In other examples, the learner may write code that fails to achieve an intended result, but may be unable to debug the non-functional code.

The techniques described herein utilize cloud workspaces to ensure that learners have easy access to required software and other resources needed for hands on learning, through the use of mediated cloud workspaces, such as cloud-provided remote desktops obtained from third party cloud providers. Notwithstanding the third-party nature of the cloud workspaces, the described techniques further enable monitoring, recording, and evaluating learner actions performed within the cloud workspaces, during many different types of hands-on learning experiences.

In the present description, a cloud provider or third-party cloud provider refers to an entity that owns or manages large quantities of computing resources, and that enables remote access to the computing resources for, e.g., deploying, testing, or managing applications and services. In this way, customers or other users of the cloud provider may obtain customized levels and types of access to the computing resources.

For example, such cloud providers may enable the use of a remote desktop, in which a desktop environment is run remotely at the cloud provider, using cloud provider hardware, while being displayed on, and accessed using, a separate client device (e.g., in a browser or other local application). In this way, for example, the local client device may have access to a desktop environment that includes, e.g., an operating system with various applications and services installed thereon. Such cloud providers are typically publicly available, but may be non-trivial for individual users to obtain, configure, and otherwise manage.

For example, although it may be theoretically possible for an individual learner to obtain such a remote desktop, the learner would be expected to experience the same types of difficulties described above with respect to configuring the remote desktop, which would be in addition to the knowledge required to provision the remote desktop, as well. Using the described techniques, however, an online learning platform provider may mediate the configuration, provisioning, and management of third party, cloud-provided remote desktops or other cloud workspaces, on behalf of many different learners. For example, an instructor may utilize the online learning platform to provision a correctly-configured cloud workspace, which may then be instantiated as often as needed for use by a plurality of learners who wish to have a hands on learning experience therewith. In this way, the learners may access the configured, provisioned cloud workspaces easily, e.g., simply by selecting a link or other indicator, within a browser or other suitable application.

The online learning platform provider may further manage an entire lifecycle of each cloud workspace instance for each learner, and on behalf of the learner. In particular, the online learning platform provider may monitor local actions of the learners for purposes of instruction or evaluation, and may provide instructional content in conjunction with the operations of the instantiated cloud workspaces.

For example, the online learning platform provider may synchronize multiple communications channels, in upstream and downstream directions, to provide learners with desired resources, and to evaluate content received from the learners. In this way, the online learning platform provider may effectively utilize and leverage available cloud computing resources, local resources of the learners, and platform-specific resources provided by the provider.

In the context of such techniques, an example of a hands-on learning experience may include a guided project, in which a learner follows, on a provided cloud workspace environment, recorded or live instructions provided by an instructor on how to solve a problem.

An example of such a problem may include writing a program to use machine learning algorithms, such as convolutional neural networks (CNNs), to classify photos of cats and dogs. In order to evaluate whether the learner has understood the solution and if she is able to apply it to a similar problem, a challenge can be used. For example, instead of providing instructions on how to solve the challenge, the learner may be asked to solve it herself, using the previously-learned techniques, and using her cloud workspace environment that is configured, provided, and managed by the online learning platform provider.

For example, following the previous example of an instruction task or tasks on how to write code to classify photos of cats and dogs, a challenge task may be provided to the learner, such as classifying photos of bags and hats. Of course, this is an extremely simplified example of a challenge task. As described in detail herein, the techniques described herein may be used to ensure that the learner has all necessary resources to complete the challenge (including local resources and provisioned cloud workspace(s) with software included thereon). Further, such resources may be ensured of being configured correctly, with input from individual learners tracked and synchronized across multiple input devices. Moreover, different submissions from many different learners may be stored and evaluated in a consistent, accurate, and timely manner. Additionally, the described techniques are able to leverage learner resources, cloud provider resources, platform provider resources, and/or content provider resources in an integrated, optimized manner.

For example, a challenge task may be used in beginner level projects, where, in order to solve the challenge, the learner needs to apply what she has just learned. In other examples, the challenge task may be used in advanced level projects, where, in order to solve a challenge, the learner may be required to apply a combination of different concepts and approaches, perhaps including concepts and approaches acquired in previous projects and courses.

Providing the learners with a cloud workspace environment, e.g., in a browser, in order for the learners to follow the instructor's guidance, and practice what they have learned, provides hands-on learning experience while also allowing the system to evaluate the learners' subject comprehension. Of course, implementing and supporting a system that needs to manage resources such as cloud workspaces in a cost-efficient manner, while also being fully available and reliable for all users around the world, is technically challenging. Building the idea of challenges for hands-on learning experiences on top of this already complicated system may utilize a framework described herein, which can provide the flexibility needed to support multiple types of challenges, each with a different purpose, and with different algorithms for determining whether a challenge is considered successfully completed or not.

In addition, the interaction of the learners with the cloud desktop enables enormous potential for automating the evaluation of the learners' subject comprehension. For example, the learner's interaction with the cloud workspace (e.g., remote desktop) can be analyzed by the system for similarities and differences with an example solution provided by the instructor. The learner's interaction may also be used to determine whether the learner solved the challenge herself, or whether somebody else did it for her, since every user has a unique way of interacting with the cloud desktop and solving a particular problem. Examples of such uniqueness may include typing speed and specific pauses between letters or symbols. Such features may be enabled by building the system in a way that allows the different content items to use the same building blocks, while at the same time supporting the flexibility of building any range of requirements, including different types, additional building blocks, or different implementations of graders.

In order to provide a good user experience, described systems and techniques that work with potentially expensive resources and complex algorithms need to be very fast, cost-efficient, and reliable while also being flexible with respect to supporting additional integrations and functionality needed by the learners. These requirements may also be addressed by specific implementations of the challenges as described herein.

Similarly to the traditional learning experience, the hands-on learning experience may have multiple forms and implementations. In the present description, some terms (e.g., guided project, instruction/challenge task, or self/peer/host approved challenge task) may be defined and used, so as to simplify the descriptions and to be able to give examples of possible implementations. Such definitions, however, should not be considered as the only possible implementations of the concept of challenges. The details of these and other implementations are set forth in the accompanying drawings, and in the description below.

FIG. 1 is a block diagram of a system 100 for evaluating learners' subject comprehension using challenges. In the example of FIG. 1, a Content Item 132 from the Content Hierarchy 130 can be, but it is not limited to, examples shown in FIG. 3, such as a Guided Project 302, Instruction Task 304, or Challenge Task 306. Each Content Item 132 may have a State 133 related to it, and a group of Tasks may be combined under a Guided Project 302. The relations between Content Items 132, 134, 136 can be stored in a Database 156. In the example of FIG. 1, and with reference to the example of FIG. 5, task 502 has Video 504, Keystream 506 and other data for playing the task stored in the Task Storage 152. The Challenge Solution Storage 154 is similar to the Task Storage 152 and, e.g., can store Video 604, Keystream 606 and other data recorded by the Challenge Solutions Recorder 150. In the present description, as described in more detail, below, keystream refers to a captured local stream of keys pressed by the learner during a hands on learning project, or by an instructor when recording instructions.

In the example of FIG. 1, part of a Content Platform 110 described below in more detail as Challenge Solution Handler 112 and Challenge Solution Feedback Handler 120 is used to process Learner 104 and Host/Instructor 102 requests related to a Content Item 132, as described in more detail in the example of FIG. 3. For example, in FIG. 1, the Challenge Solution Feedback Handler is illustrated as including Challenge Solution Grader 122 with a set of Grader rules 124, 126, . . . to grade the Solution submitted by the Learner 104. A set of example grader rules is shown below in FIG. 15, FIG. 16 and FIG. 17.

In the example of FIG. 1, a UI generator 140 is configured to provide one or more graphical user interfaces to the Learner 104 and the Host/Instructor 102. For example, such graphical user interfaces may be used to submit new Challenge Solutions 308, when such Solution is recorded with the use of the Challenge Solution Recorder 150.

The Challenge Solution Recorder may be configured to record the Learner 104 interaction with the Cloud Workspace 106 in the graphical user interface generated by the UI Generator 140. An example output of this Recorder is the Video 504 and Keystream 506 of FIG. 5, which are synchronized and may later be stored in the Challenge Solution Storage 154. This recorded interaction can later help for the grading of this Challenge Solution. Either by using an automated Grader Rule 124, or review and evaluation from the Host/Instructor 102, Challenge Solution Feedback 312 of FIG. 3 may be submitted to the Challenge Solution Feedback Handler 120.

FIG. 1 displays an example messaging service 160 which includes but it is not limited to notifiers about challenge solutions being added (New Challenge Solution Notifier 162), updated (Challenge Solution State Changed Notifier 166) or feedback being submitted for a challenge solution (New Challenge Solution Feedback Notifier 164).

Finally with respect to FIG. 1, the content platform 110 and messaging service 160 are shown as being executed using at least one computing device 170, which itself includes at least one processor 172 and a non-transitory computer readable storage medium 174. For example, the at least one computing device 172 may represent one or more computing devices configured to implement the content platform 110 by causing the at least one processor 172 to access corresponding instruction stored using the non-transitory computer readable storage medium 174.

Of course, as is apparent, the at least one computing device 170 is intended as a highly simplified representation of the types of computing devices that may be utilized to provide the content platform and messaging service and therefore does not explicitly illustrate various known hardware/software components that may be utilized in the various implementations of the system 100.

Further, although the content platform 110 is illustrated as including a number of separate, discrete components, it will be appreciated that any two or more components or sub-components may be combined for operation of the single component, while, conversely, a single component may have two or more of its functions implemented using two or more separate components.

In various embodiments, the system 100 may be implemented in an architecture in which the at least one computing device 170 represents one or more back-end devices (e.g. web server, application server, or database system) that are configured to store, maintain and process data. As with most such backend/frontend architectures, a manner and extent to which various features and functionalities are provided using the backend, as opposed to the front-end, may be at least partially configurable.

Figure 21:
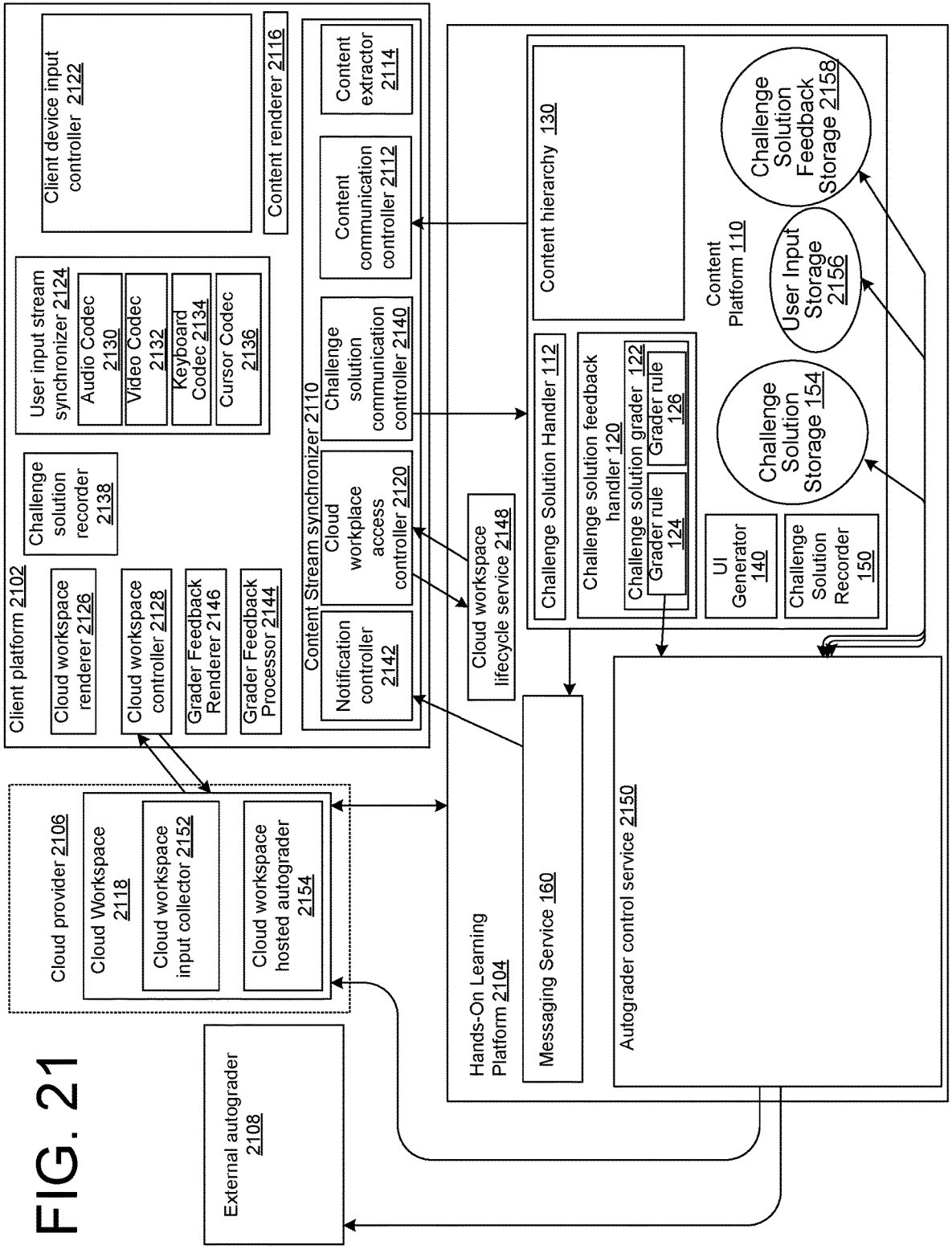
FIG. 21 is a block diagram illustrating an example architecture of a system for challenges and autograder integration.

In particular, as illustrated and described with respect to FIG. 21, the learner 104 may experience the cloud workspace 106, obtained from a cloud provider and mediated by the content platform 110, using a local client platform and associated hardware, which, as mentioned, may include standard components, such as a keyboard, mouse, camera, and other input/output devices. Synchronization and integration of data characterizing corresponding local operations and actions with operations of the cloud workspace 106, and with content provided by the content platform 110, across many different learners, enables the types of challenges and autograding solutions described herein.

Figure 2:
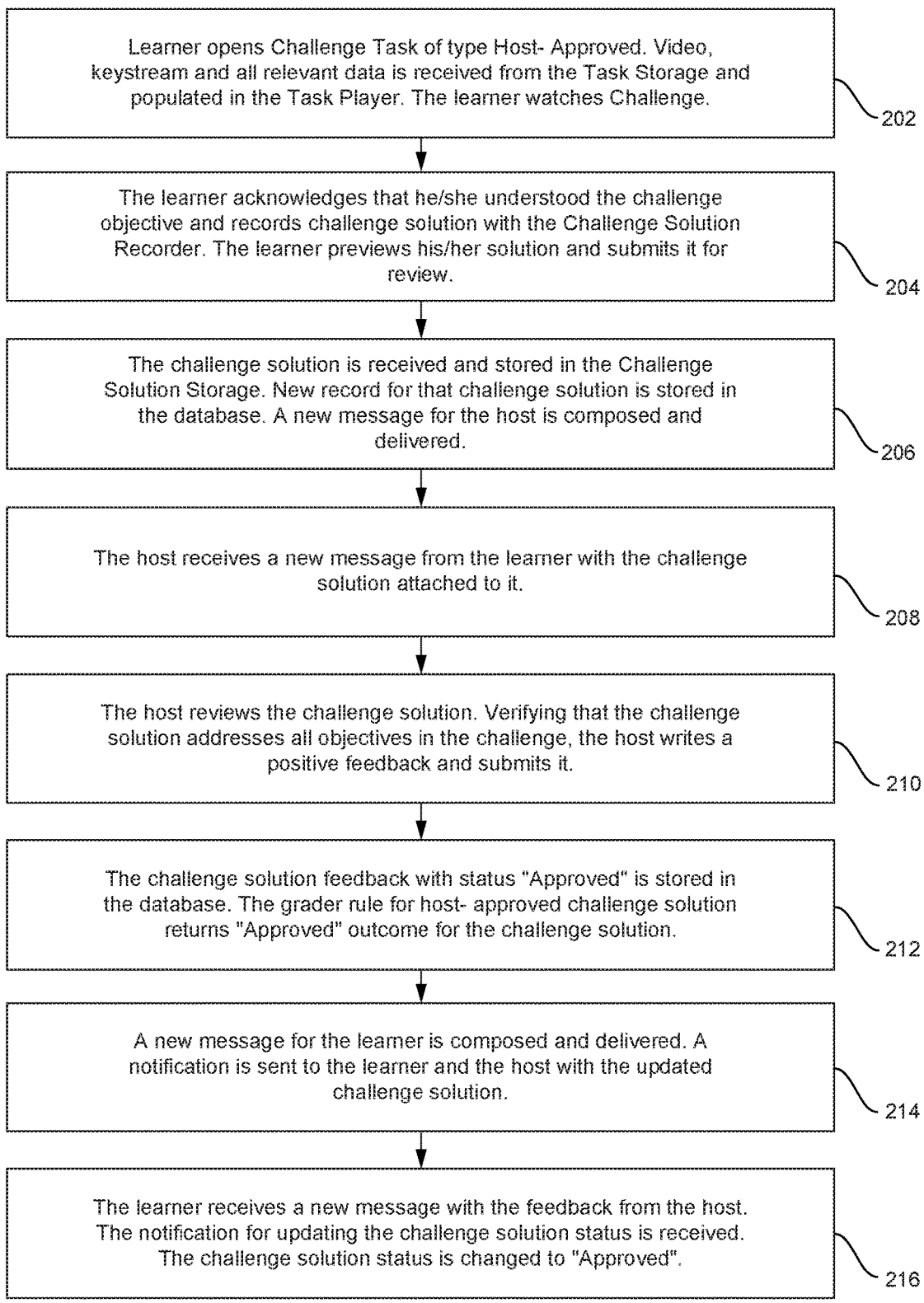
FIG. 2 is a flowchart illustrating example operations of the system of FIG. 1.

FIG. 2 is a flowchart 200 illustrating example operations of the system 100 of FIG. 1 while Learner 104 and Host/Instructor 102 interact with the system 100. In the example of FIG. 2, operations 202-216 are illustrated as separate, sequential operations. However, it will be appreciated that, in alternative embodiments additional or alternative operations or sub-operations may be included, operations may be performed in a different order than that shown, and/or one or more operations or sub-operations may be omitted. Further, it may occur that any two or more operations or sub-operations may be executed in a partially or completely overlapping or parallel manner or in a nested, iterative, looped, or branched fashion.

Figure 3:
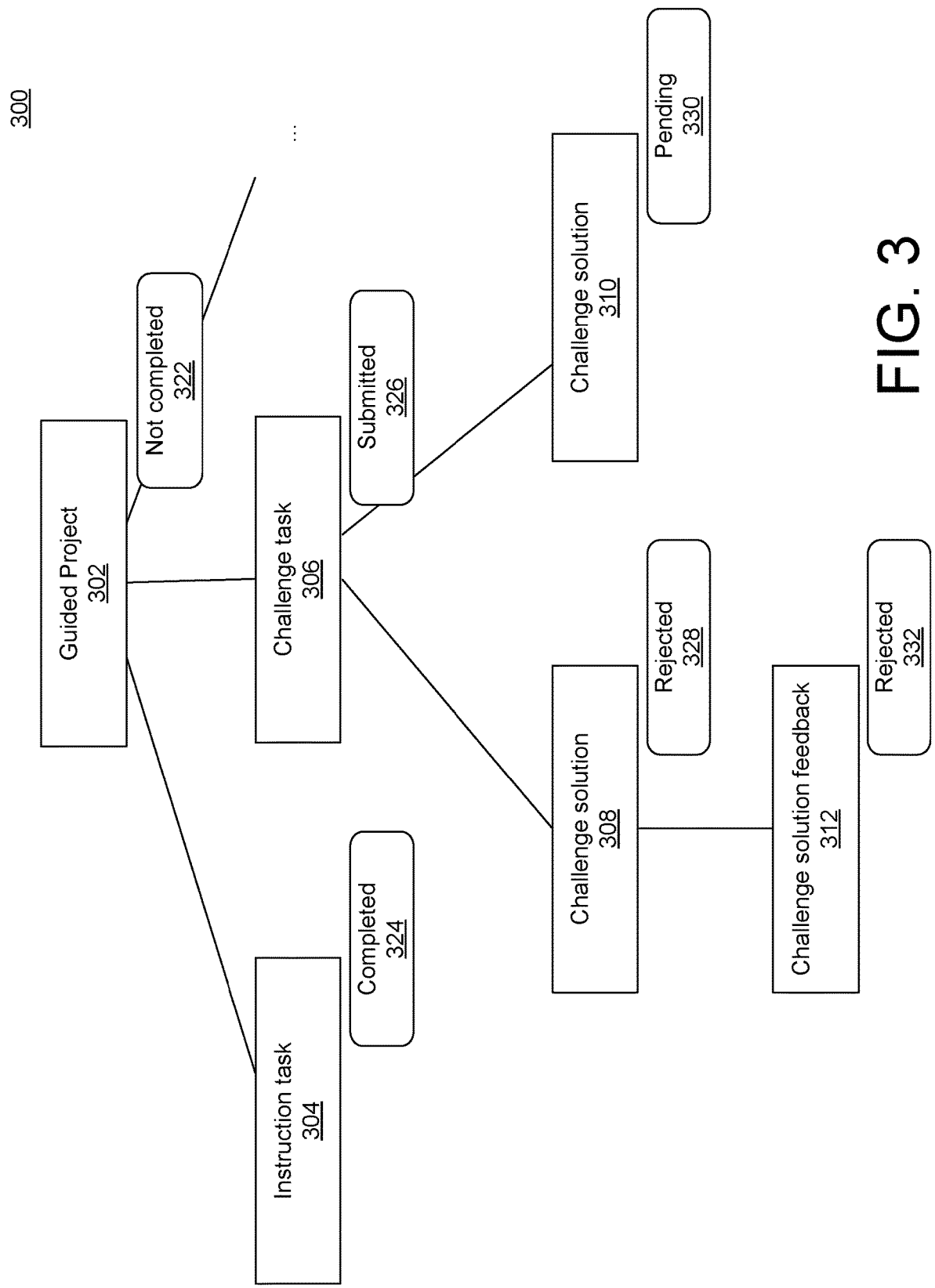
FIG. 3 is a block diagram of a content hierarchy used in the system of FIG. 1.
Figure 4:
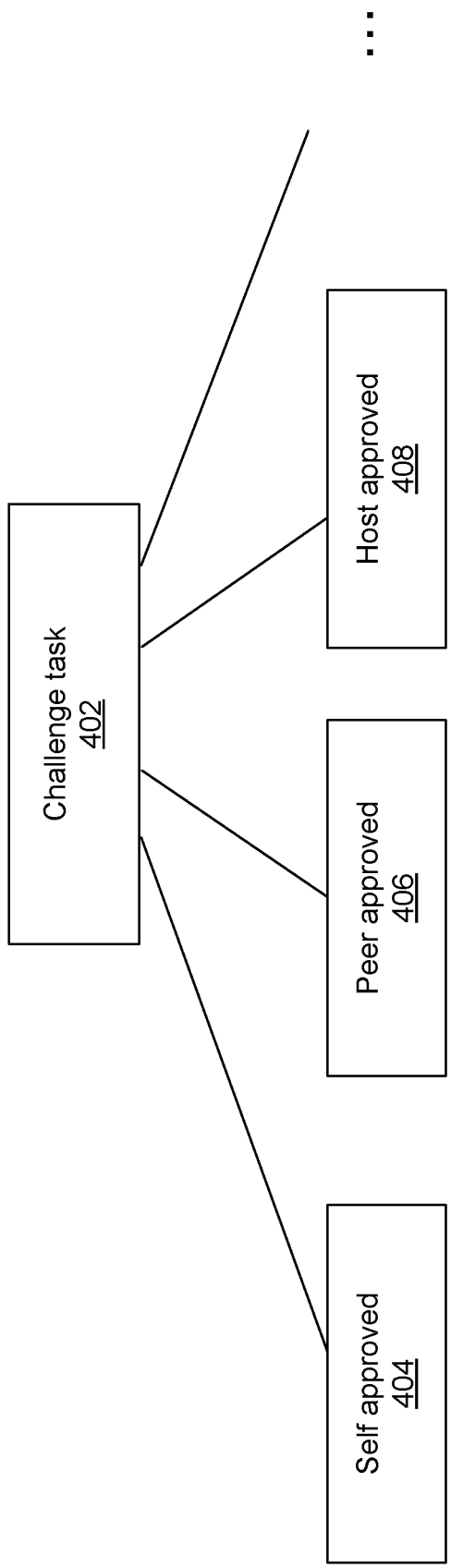
FIG. 4 is a block diagram illustrating different types of challenge tasks used in FIG. 3.

In the example of FIG. 2, Learner 104 interacts with the system 100 and opens a Challenge Task 306 of type Host-Approved 408, as shown in FIGS. 3 and 4. The video and keystream and all relevant data for this Task may be received from the Task Storage 152 and Database 156. The UI Generator 140 generates a user interface that can play the stored video and keystream to the Learner 104. The learner 104 is able to watch the Challenge Task. Once the challenge task is watched, the learner 104 acknowledges that he/she understood the challenge objective and with the help of the Challenge Solution Recorder 150, records a challenge solution while interacting with the Cloud Workspace 106 and completing the challenge objectives.

Once recorded and stored in the Challenge Storage, this Challenge Solution is submitted to the system 100 and processed by the Challenge Solution Handler 112, which will store the record for this challenge solution in the database. A message may be composed and delivered to the host via the Messaging service 160.

The following steps 208 and 210 are examples of how the Host/Instructor 102 may interact with the system. The Host 102 will receive the new Challenge Solution and, using the recorded data in the Challenge Solution Storage, he/she can review the Challenge Solution and evaluate how well the Learner has covered the objectives of the Challenge. In the example of FIG. 2 the host 102 verifies that the solution covers all objectives and submits positive Challenge Solution Feedback 312, which is processed in the Challenge Solution Feedback Handler 120. Such positive feedback (with state "Approve") will also approve the Challenge Solution (see, e.g., Host-Approved Grader Rule on FIG. 16). A new notification will be delivered to the Learner for the new Challenge Solution Feedback (see, e.g., FIG. 19 New Challenge Solution Feedback Notifier). After the Challenge Solution state is changed, a new notification will be delivered via the Challenge Solution Feedback Notifier 164. Both the Host and the Learner will receive this new state. After receiving this notification, the Learner will see his/her challenge task as "Completed" and can proceed with the Guided Project.

FIG. 3 is a block diagram illustrating an example of the content hierarchy 300 illustrating an example of a content hierarchy 130 of FIG. 1. In the example of FIG. 3, a content item is illustrated as a node 302 representing a guided project. This guided project content node can have multiple child nodes called tasks: 304 and 306. There could be multiple types of task nodes.

The example of FIG. 3 shows two types of tasks: an instruction task 304 and a challenge task 306. For example, an instruction task could be a task containing instructions on how a problem can be solved. Whereas, a challenge task contains instructions on what problem the learner 104 should provide a solution for. As also illustrated, a challenge task 306 may itself be a parent node to one or more child nodes called challenge solutions: 308 and 310. Similarly, a challenge solution 308 may itself be a parent node to one or more child nodes called challenge solution feedbacks 312. Once a reviewer or an autograder reviews a learner's challenge solution, a challenge solution feedback is created and associated with the parent challenge solution. Of course, the hierarchy 300 should be understood to represent a potentially small fraction of a larger content hierarchy, simplified in FIG. 3 for sake of consistency.

As also illustrated, each of the nodes 302-312 is associated with state data. For example, node 302 is associated with state 322 illustrating an aggregated state of all child task nodes. The instruction task 304 has associated state 324 which could be considered as completed once a learner watches the instructions provided by the instructor, without additional actions from the learner being required.

However, some tasks could require additional actions from the learner 104 in order for the task to be marked as completed. In FIG. 3 such an example is the challenge task 306. The associated state 326 of node 306 is an aggregation of the state of the child challenge solution nodes 308 and 310. As stated above, a challenge solution node can have one or more challenge solution feedback child nodes. Similarly, the state 328 associated with the challenge solution node 308 is an aggregation of the states of its challenge solution feedback nodes using the challenge solutions grader 122. If a challenge solution was not reviewed, this would mean that a challenge solution feedback was not created and the state 330 associated with the challenge solution node 310 would have value "pending".

FIG. 4 illustrates an example of different types of challenge tasks. This example illustrates three types for the challenge task 402: a self approved challenge 404, a peer approved challenge 406, or a host approved challenge 408. In this document, these three types of challenge tasks are described as examples to show different implementations of these types, but many more types of challenge tasks are possible. The challenge task type determines who can review a challenge solution, which grader rule (124, 126) will be used, and other review/evaluation parameters.

A self approved challenge 404 is a challenge that doesn't require a peer or a host 102 to review the challenge solution. Instead, the challenge will be automatically marked as approved. A peer approved challenge 406 is a challenge which requires peers (e.g., other learners) to review and approve or reject the challenge solution. Based on the grader rule described by FIG. 19, the state of the peer approved challenge will be marked as approved or rejected. A host approved challenge 408 is a challenge that requires the host to review the challenge solution. Based on the grader rule described by FIG. 18, the state of the host approved challenge will be marked as approved or rejected.

Figure 5:
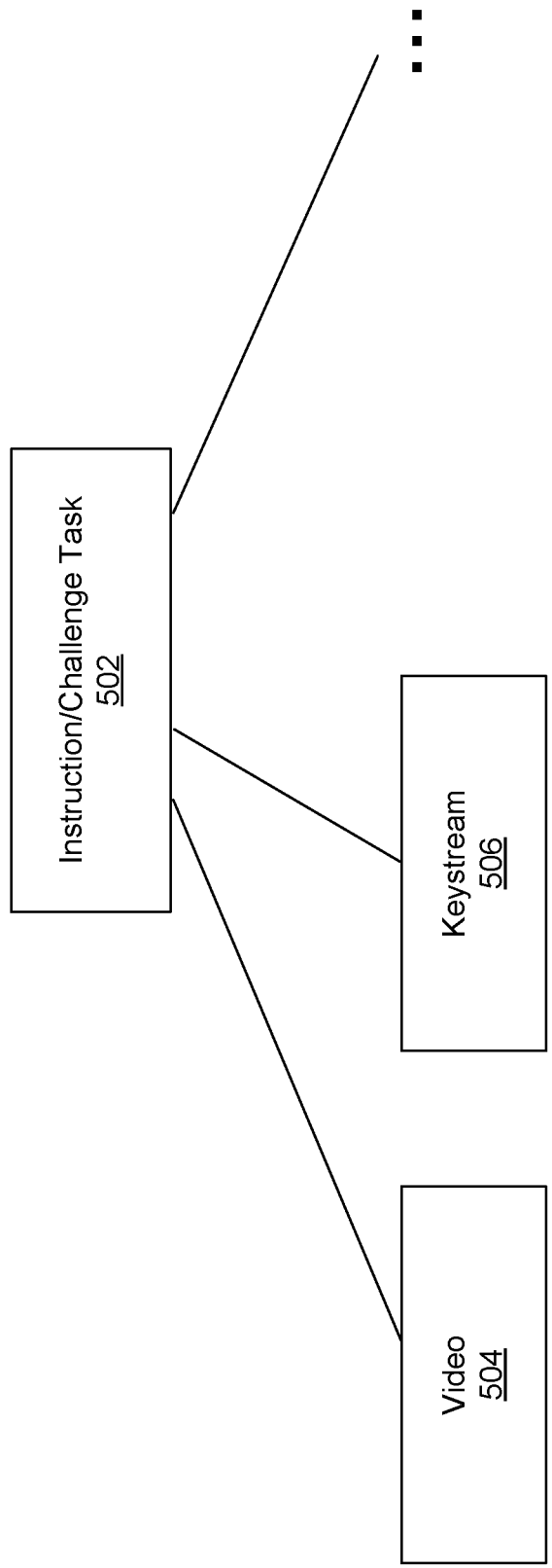
FIG. 5 is a block diagram of the structure of a task used in FIG. 3.

FIG. 5 illustrates an example of the structure of a task used in FIG. 3. This diagram illustrates some of the entities of task 502. In this example, both types of tasks (i.e., instruction and challenge tasks) contain a video 504 and a keystream 506. For an instruction task, video 504 contains instructions provided by the instructor 102 on how a problem can be solved. The learner 104 follows these instructions on their cloud workspace 106 in order to solve the same problem. For a challenge task, video 504 contains instructions provided by the instructor 102 on what problem the learner 104 should provide a solution for. In this case, the learner 102 will not follow specific instructions on how to solve the problem, but will be required to provide a solution to the problem by herself.

Similarly, both types of tasks contain a keystream 506. As referenced herein, a keystream is a sequence of pressed keyboard keys, cursor moves and clicks, and the associated timestamps with these events. For an instruction task, keystream 506 contains the instructor's pressed keys, cursor moves and clicks used while recording the instructions on how a problem can be solved. For a challenge task, keystream 506 contains an example of a sequence of pressed keys, cursor moves and clicks used by the learner 104 for solving a problem provided by the instructor 102. Later, the keystream associated with a challenge task can be used as part of the challenge solution grader 122.

Figure 6:
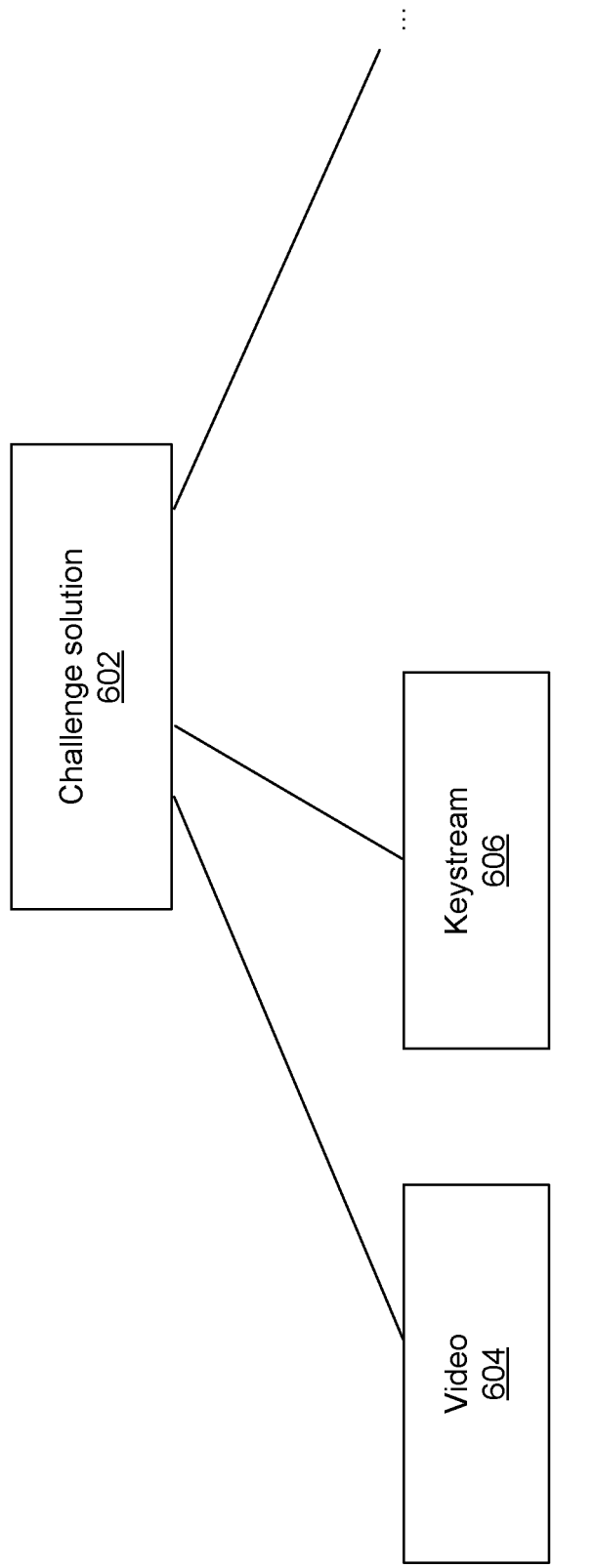
FIG. 6 is a block diagram of the structure of a challenge solution used in FIG. 3.

FIG. 6 illustrates an example of the structure of a challenge solution used in FIG. 3. This diagram illustrates some of the entities of challenge solution 602. In this example, challenge solution 602 contains a video 604 and a keystream 606. Video 604 is recorded by the learner 104 using the challenge solution recorder 150. In this video, the learner demonstrates her solution and explains the decision-making process behind her solution. By providing such a video, the reviewers of the solution will have more information on how the challenge was solved and why it was solved this way. The keystream 606 contains the sequence of the learner's pressed keys, cursor moves and clicks while solving the problem. Later, this keystream can be used as part of the challenge solution graded 122 by analyzing the similarities and differences between the keystream 606 provided by the learner 104 and the keystream 506 provided by the instructor 102.

Figure 7:
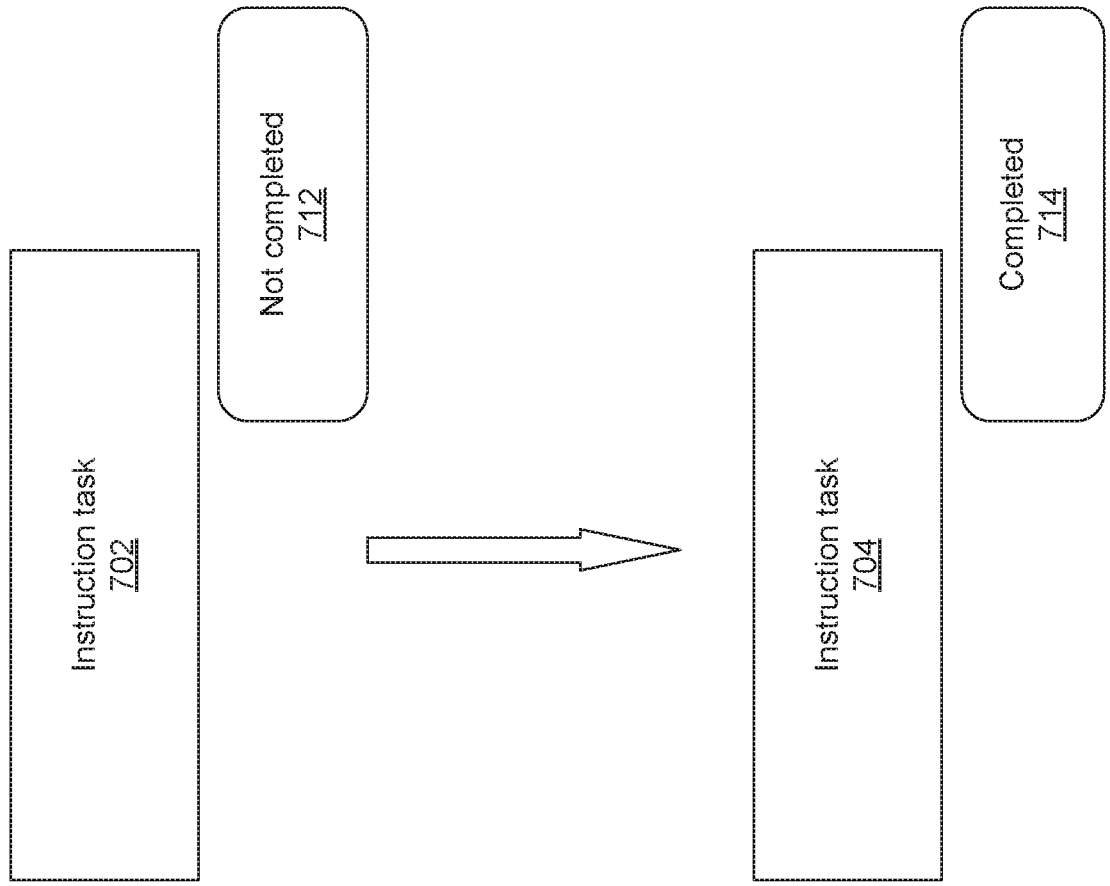
FIG. 7 is a block diagram illustrating the possible state changes for an instruction task used in FIG. 3.

FIG. 7 is a block diagram illustrating the possible state changes for an instruction task used in FIG. 3. Node 702 illustrates an instruction task associated with a state 712 "not completed". In response to an event "watch" 720, the instruction task 702 has its state 712 updated accordingly, as illustrated by the updated instruction task 704 and its associated state 714, which has a value of "completed". The purpose of this diagram is to illustrate a type of a task that doesn't require additional actions from the learner 104 in order for its state to be updated to "completed", as simply watching the instruction video provided by the instructor 102 is sufficient.

Figure 8:
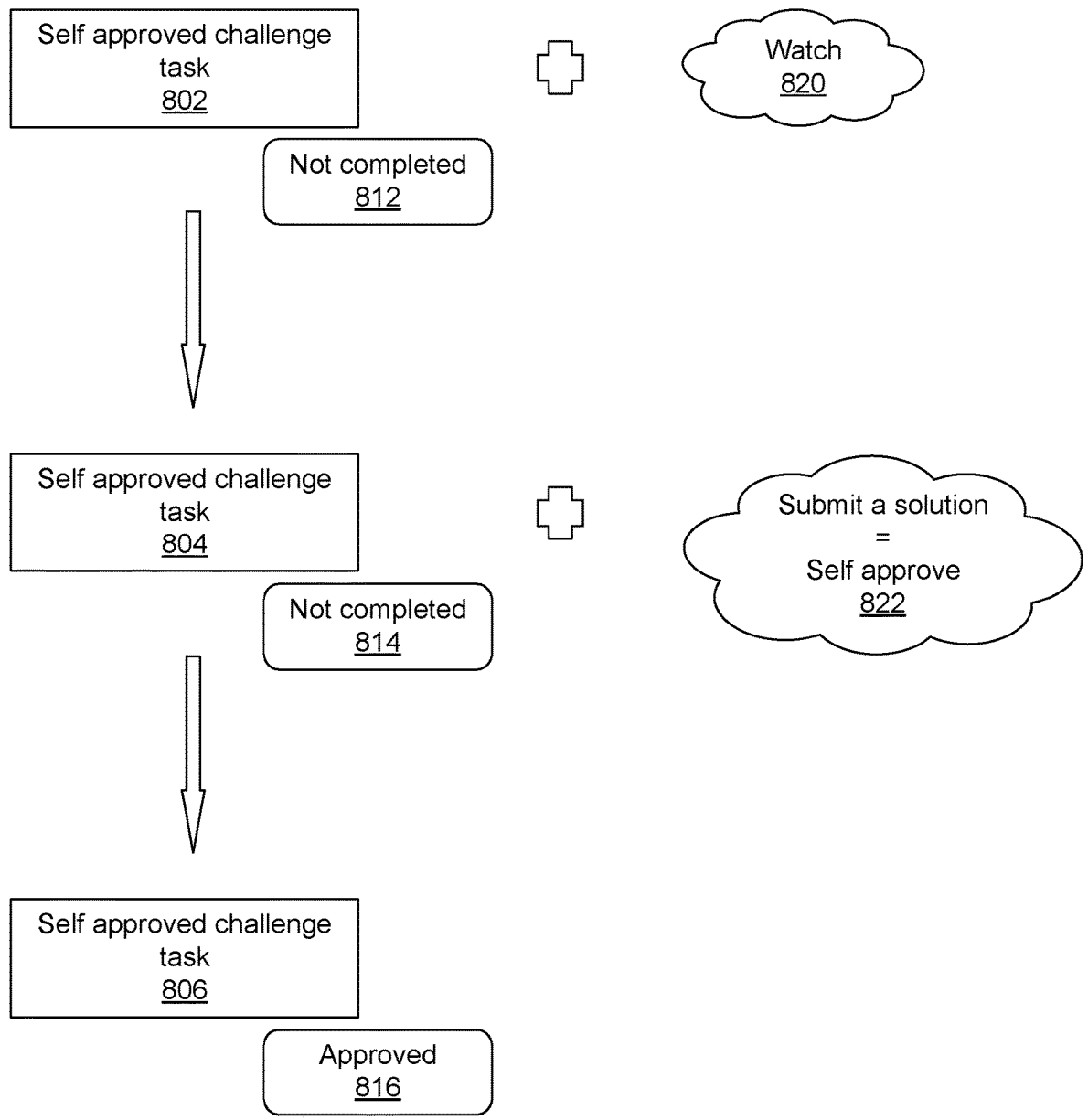
FIG. 8 is a block diagram illustrating the possible state changes for a challenge task of type self-approved, as defined in FIG. 4 and used in FIG. 3.

FIG. 8 is a block diagram illustrating the possible state changes for one of the challenge task types described in this description: a self-approved challenge task. Node 802 illustrates a self-approved challenge task associated with state 812 "not completed". In response to an event "watch" 820, the self-approved challenge task 802 doesn't have its state 812 updated as illustrated by the node 804 and its state 814. The reason for this, as referenced with respect to FIG. 3, the difference between an instruction task and a challenge task is that the instruction task contains instructions provided by the instructor 102 on how a problem can be solved, whereas, a challenge task contains instructions on what problem the learner 104 should provide a solution for. As a result, the instruction task doesn't require any additional actions from the learner 104, whereas the challenge task requires some additional actions. Accordingly, the "watch" event 820 is not enough to update the self-approved challenge task's state to "completed".

As mentioned in the description of FIG. 4, the challenge task type defines who can review the challenge solution. In the case of a self approved challenge, no additional review from a peer or an instructor is required and the learner 104 can submit a solution 822 which will be considered as self-approving the solution. In response to this event, the self-approved challenge task 804 has its state 814 updated accordingly, as illustrated by the updated self-approved challenge task 806 and its associated state 816, which has a value of "approved".

Of course, the states and the events used in FIG. 7-11 are used only to demonstrate an example combination of events, states, and their relation to a task type, but do not limit the possible types, states, and events that can be used for evaluating the learners' subject comprehension.

Figure 9:
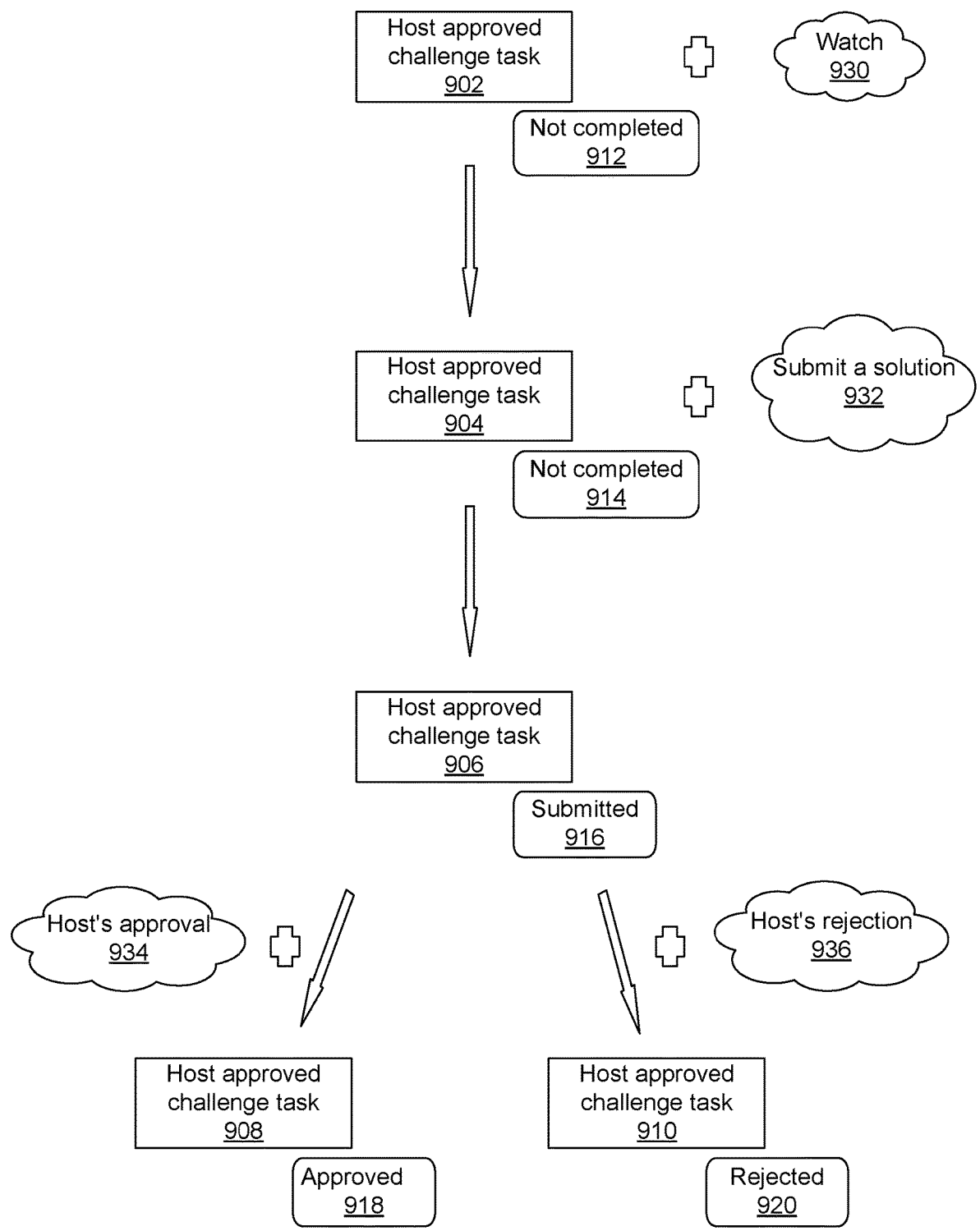
FIG. 9 is a block diagram illustrating the possible state changes for a challenge task of type host-approved, as defined in FIG. 4 and used in FIG. 3.

FIG. 9 is a block diagram illustrating the possible state changes for another one of the challenge task types described herein: a host approved challenge task. Node 902 illustrates a host approved challenge task associated with state 912 "not completed". Similarly to FIG. 8, in response to an event "watch" 930, the host approved challenge task 902 doesn't have its state 912 updated as illustrated by node 904 and its state 914. The reason, as already described, is that the challenge tasks require additional actions from the learner 104 in order to update the state of the challenge task. However, in the case of a host approved challenge, the "submit a solution" event 932 is not enough to update its state 914 to "approved". Instead, in response to a "submit a solution" event 932, the host approved challenge task 904 has its state 914 updated accordingly, as illustrated by the updated host approved challenge task 906 and its associated state 916, which has a value of "submitted".

This event will also trigger the Challenge Solution Handler 112 which, using the New Challenge Solution Notifier 162, will notify the host 102 that a new solution was submitted that requires a review from the host. The host 102 can trigger two types of events: approve or reject, and can provide feedback to the learner. In response to a "host's approval" event 934, the host approved challenge task 906 has its state 916 updated accordingly, as illustrated by the updated host approved challenge task 908 and its associated state 918, which has a value of "approved". In response to a "host's rejection" event 936, the host approved challenge task 906 has its state 916 updated accordingly, as illustrated by the updated host approved challenge task 910 and its associated state 920, which has a value of "rejected".

These events, which are a result of a review of a challenge solution, will create a challenge solution feedback illustrated by node 312 of FIG. 3. With reference back to FIG. 1, the creation of such challenge solution feedback will also trigger the Challenge Solution Feedback Handler 120, which will trigger the New Challenge Solution Feedback Notifier 164 or the Challenge Solution state Changed Notifier 166.

As illustrated in FIG. 9, once a "host's rejection" 936 event is triggered, "rejected" may not be the final state of the host-approved challenge task. An example of a possible next flow is illustrated in FIG. 10.

Figure 10:
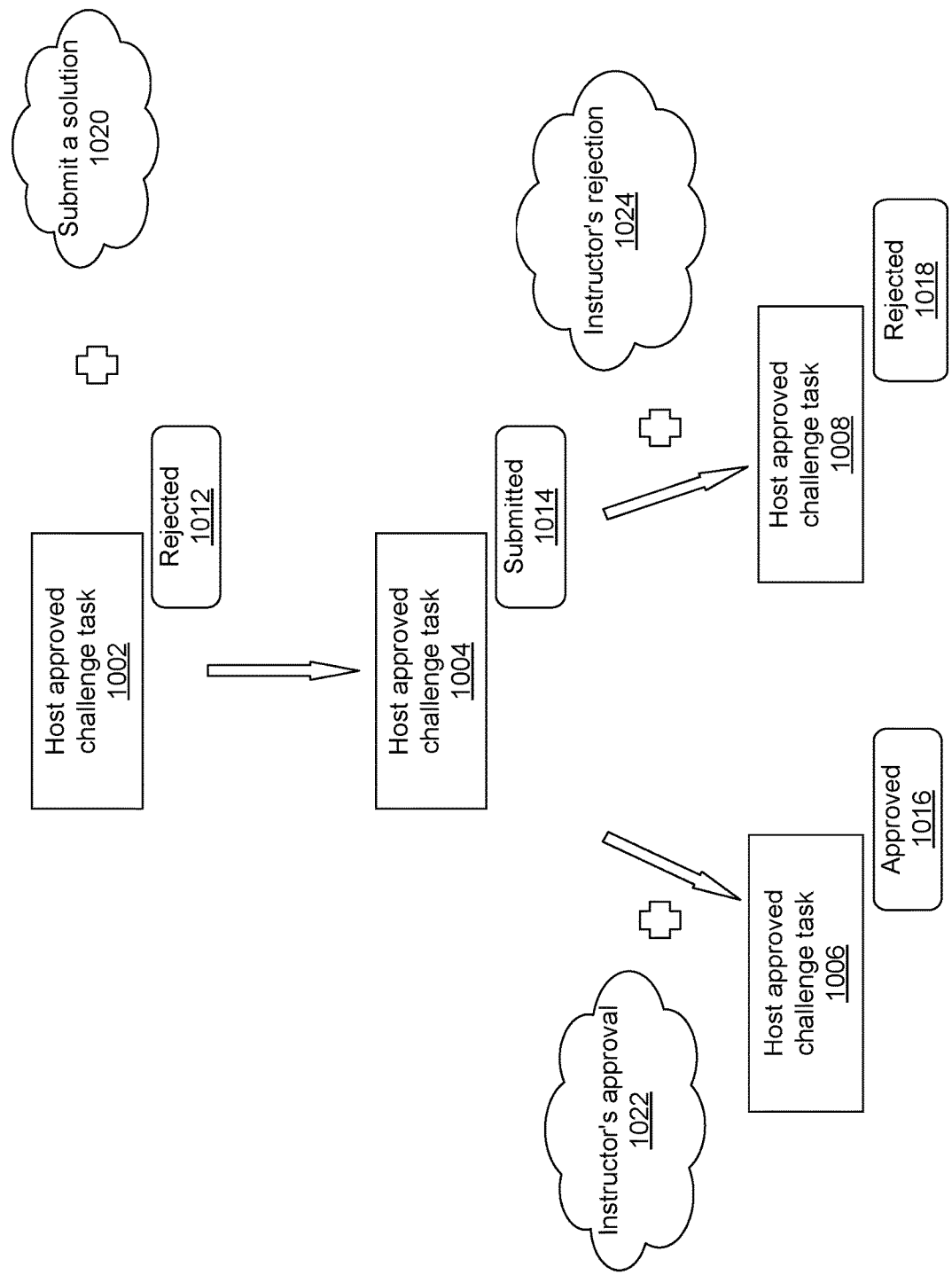
FIG. 10 is a block diagram illustrating the possible state changes for a host approved challenge task with an associated state "rejected" shown in FIG. 9.

FIG. 10 is a diagram illustrating an example of a possible flow after a host approved challenge task's state was updated to "rejected". Node 1002 illustrates a host approved challenge task with associated state "rejected" 1012. In this example, once a host approved challenge task is rejected by the host 102, the learner 104 can submit a new solution addressing the feedback provided by the host as part of the "host's rejection" event 926 from FIG. 9. In response to an event "submit a solution" 1020, the host approved challenge task 1002 has its state 1012 updated accordingly, as illustrated by the updated host approved challenge task 1004 and its associated state 1014, which has a value of "submitted".

Similarly to the description of FIG. 9, this event will trigger the Challenge Solution Handler 112, which, using the New Challenge Solution Notifier 162, will notify the host 102 that a new solution was submitted and requires a review from the host 102. The next possible steps are the same for a host approved challenge task which has a state "not completed" or "rejected" in the previous step. As illustrated in this example, in response to a "host's approval" event 1022, the host approved challenge task 1004 has its state 1014 updated accordingly, as illustrated by the updated host approved challenge task 1006 and its associated state 1016, which has a value of "approved". In response to a "host's rejection" event 1024, the host approved challenge task

1004 has its state 1014 updated accordingly, as illustrated by the updated host approved challenge task 1008 and its associated state 1018, which has a value of "rejected".

The flow described by FIG. 10 can be repeated as many times as needed in order for the host approved challenge task's state to be updated to "approved," or may be ended by rule after a defined number of iterations. For example, such a rule may be that a learner can submit a new challenge solution after a rejection only N number of times. These rules can be much more complex, as well.

Figure 11:
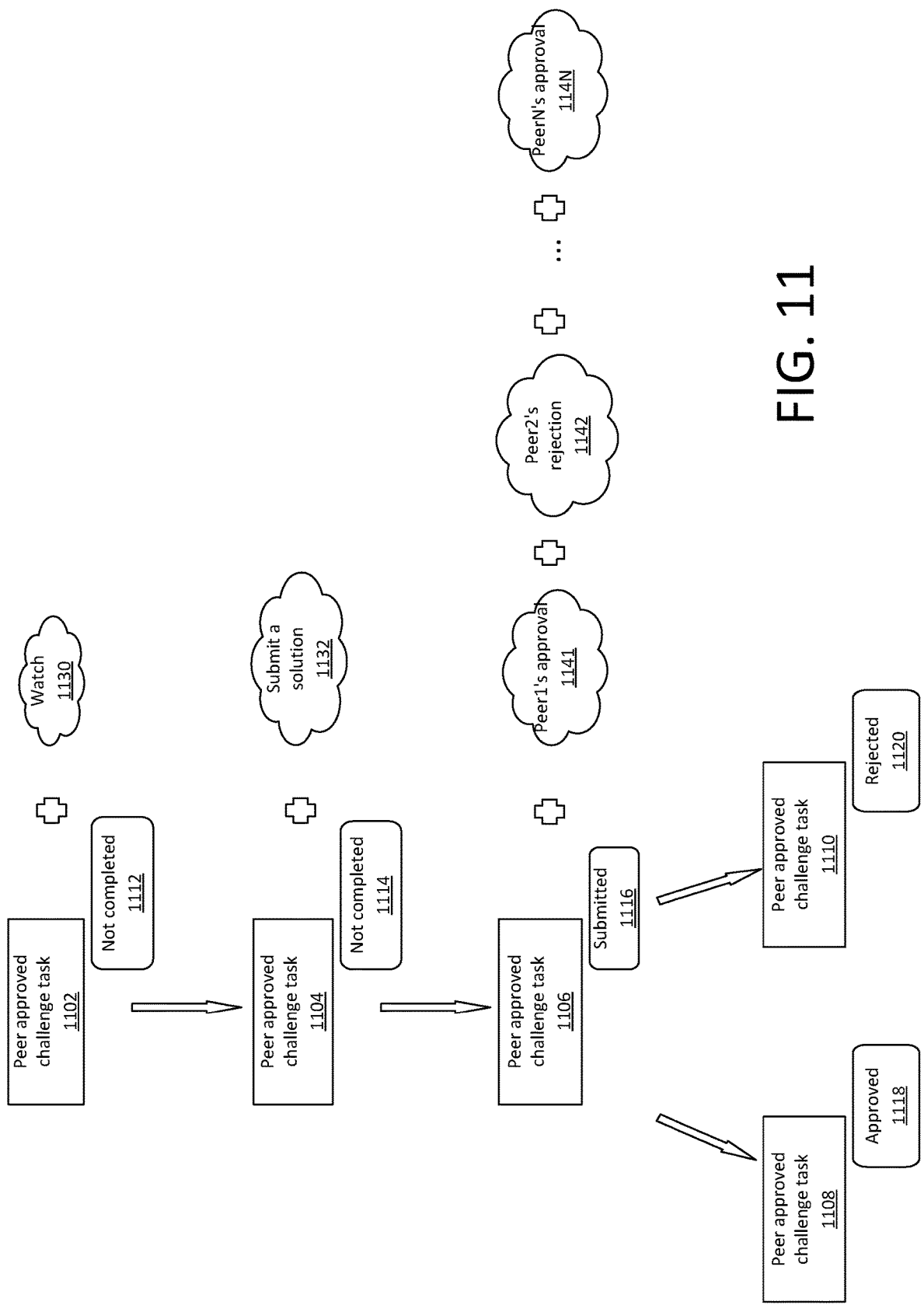
FIG. 11 is a block diagram illustrating the possible state changes for a challenge task of type peer approved, as defined in FIG. 4 and used in FIG. 3.

FIG. 11 is a block diagram illustrating the possible state changes for one of the challenge task types described herein: a peer approved challenge task. In this example, node 1102 illustrates a peer approved challenge task with associated state "not completed" 1112. Similarly to the host approved challenge task, in response to the "watch" event 1130 the peer approved challenge task 1102 doesn't have its state 1112 updated as illustrated by the node 1104 and its state 1114. In response to the "submit a solution" event 1132 the peer approved challenge task 1104 has its state 1114 updated as illustrated by the node 1106 and its state 1116, which has a value of "submitted".

The difference between the host approved and the peer approved challenge tasks is the number of reviews required in order for a challenge task's state to be updated to "approved" or "rejected". As previously referenced, the terms host approved and peer approved challenge task are used just as an example of possible implementations of the challenge idea. However, the challenge task type called "host approved" may require more than one review from a host. For example, there may be multiple combinations of reviews from multiple hosts, from hosts and peers, or from hosts and peers who have a specific role. The used terms, states, and flows are used only to simplify the examples and provide an easy understanding of how these concepts can be differentiated.

Once a challenge solution for a peer approved challenge task is submitted, the Challenge Solution Handler 112 will be triggered and the New Challenge Solution Notifier 162 will notify the peers who need to review the submitted challenge solution. The rules for which peers to be notified can be globally defined by the system or defined per project/instructor/etc. The rules may also be dynamically defined based on different inputs. An example of such a rule can be: "if the learner submitting a challenge solution has a history of approved solutions by all peers, don't require the minimum count of peer reviews defined for this project but only half of this count."

As illustrated in FIG. 11, in response to the aggregated state of the reviews from events "peer1's approval" 1141, "peer2's rejection" 1142, ..., "peerN's approval" 114N, will update the state 1116 of the peer approved challenge task 1106, to either peer approved challenge task 1108 with associated state 1118, which has a value of "approved", or to peer approved challenge task 1110 with associated state 1120, which has a value of "rejected". The rule for the aggregate state of these reviews can have multiple implementations based on the project, the instructor, the learner who submitted the challenge solution, etc. In some cases, in order for the aggregated state to be "rejected" only one "peer's rejection" event may be needed. As in other cases, the aggregated state can be considered "approved" unless more than half of the events are "peer's rejection".

Figure 12:
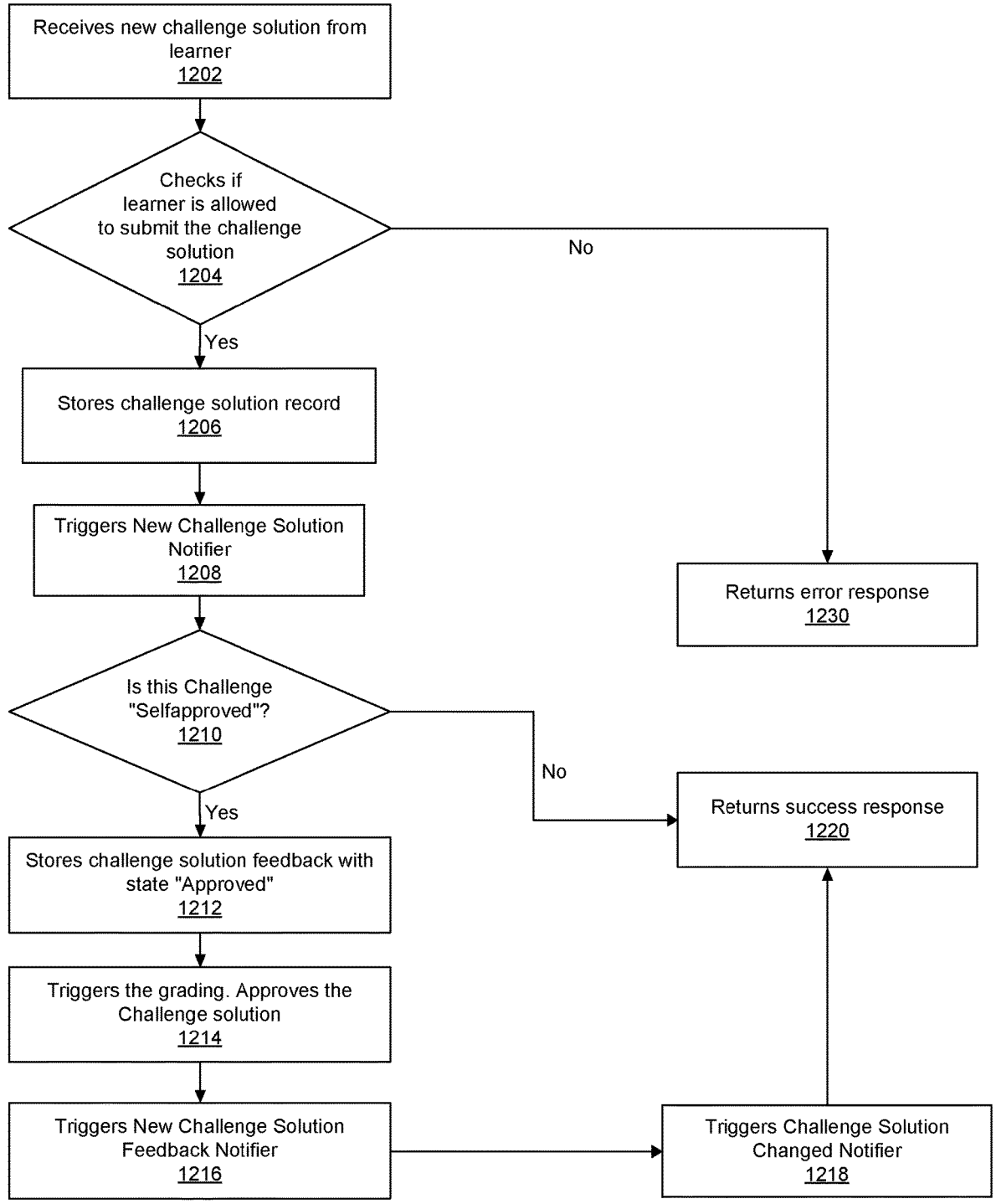
FIG. 12 is a flowchart illustrating example techniques for executing the Challenge Solution Handler from FIG. 1.

FIG. 12 is a flowchart illustrating example techniques for executing the Challenge Solution Handler from FIG. 1. In this example, the handler is executed when a Learner 104 is submitting a new challenge solution. A trigger for this handler can be a request sent from the UI generated by the UI Generator 140. In the example flow diagram 200, this could be found in step 206. In the request that is sent from the UI there is the new challenge solution from the learner 104. This challenge solution is received in the handler 1202. In the example flowchart on FIG. 12 there is an additional guard to check whether the learner is allowed to submit a solution. In this example a learner that just submitted a solution is not allowed to resubmit before the first solution is reviewed. A learner may not be allowed to submit a solution if he/she did not complete the tasks prior to the Challenge Task for which he/she is submitting the solution. As illustrated in FIG. 12, those checks are shown as 1204, and if any of them fail and results in the Learner not being allowed to submit a solution, the handler 1202 will return an error response 1230.

If the Learner has permissions to submit the challenge solution, the handler 1202 will store the challenge solution record 1206 to the database 156 with pointers to all relevant data that is stored in the Challenge Solution Storage 154. The record itself is type of Content Item 134 and it would have a State 135 associated with it. An example State for new challenge solution records being stored in the database, at this step, would be "submitted". Such records are used in the next step to trigger the new challenge solution notifier 1208 to provide the information for the new challenge solution to the reviewer via the UI and/or email or other means of contacting the reviewer. FIG. 4 displays a few different types of challenge tasks. One such type is the "Self-Approved" task which does not require to be reviewed by anyone. For this type of Challenge the Challenge Solution may be assumed to be "Approved" when submitted. For consistency with the system 100 and the framework for Challenges described herein, the handler 1202 will check whether the Solution is for a Challenge of type Self-Approved 1210. If that is the case, the handler 1202 will store a generated Challenge Solution Feedback with state "Approved" 1212 and trigger the Grader 122 with the specific grader rule 124 for Self-Approved Challenge. There is an example diagram of this Grader Rule in FIG. 15. After the grading is done, the handler 1202 will trigger both the new challenge solution feedback notifier 1216 and challenge solution changed notifier 1218 before returning a successful response 1220. In the case where the Challenge is not of type Self-approved, the successful response will be returned 1220 after the New Challenge Solution Notifier has been triggered 1208.

Figure 13:
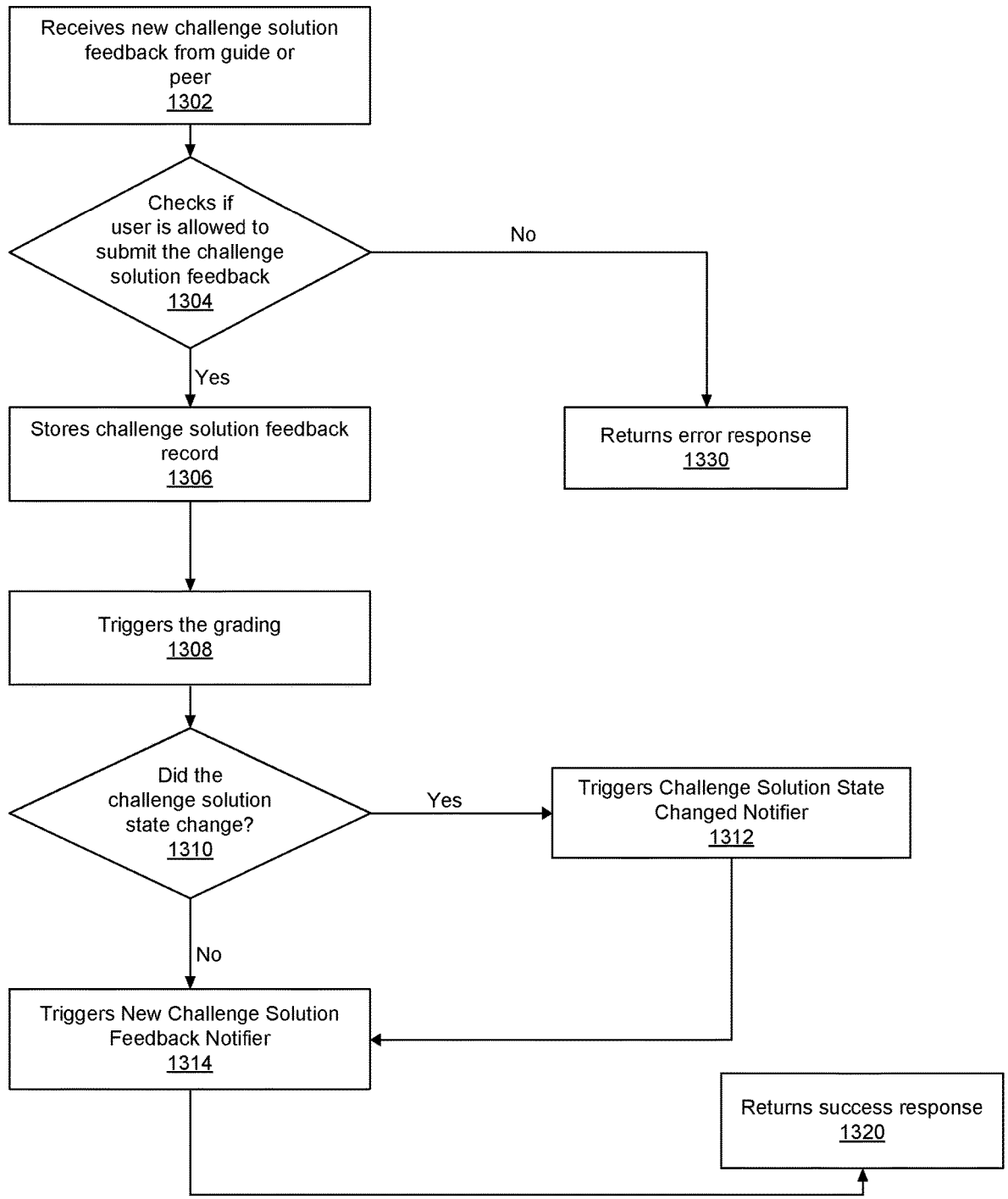
FIG. 13 is a flowchart illustrating example techniques for executing the Challenge Solution Feedback Handler from FIG. 1.

FIG. 13 is a flowchart illustrating example techniques for executing the Challenge Solution Feedback Handler 120 from FIG. 1. In the example of the flowchart show in FIG. 2, host-approved challenge flow 200, this handler 120 will be executed when the Host/Instructor 102 submits a positive feedback for the challenge solution on step 210. In general, this handler can be triggered when a feedback is submitted by a reviewer via the UI generated by the UI Generator 140. The new challenge solution feedback is part of the requests that trigger the handler 1302. Since not everyone is allowed to submit feedback for a given solution, so the next step the handler does is to check whether the user has permissions to submit the feedback 1304. An example of user who is not allowed to submit feedback would be a peer that is not a host/instructor trying to submit feedback for Host-Approved challenge 408, a user who already submitted feedback for this specific solution and is trying to submit a second one for the same solution, or a user that is not even enrolled in the same guided project. All requests made from users that are not allowed to submit the challenge solution feedback result in error response from the handler 1330. In the example, if the user has the permissions to submit the feedback, a challenge solution feedback record will be prepared and stored 1306 in the database 156. Each feedback record is an instance of Content Item 134 and has a State 135 associated with it. As illustrated in FIG. 13, after a new feedback record is stored, the handler will trigger the grader 122 to update the challenge solution state if needed. Based on the state 135 and the grader rule 124, the challenge solution state may change. In the example FIG. 13, the handler will do a check if the state has changed 1310 and trigger the desired notifiers if the state has changed. If the challenge solution state has changed the handler will trigger the Challenge Solution State Changed notifier 1312. In both cases the handler will trigger the New Challenge Solution Feedback 1314 to notify all users that should be notified (peers, hosts, the learner that submitted the challenge solution). In the example the final step of the Challenge Solution Feedback handler is to return a successful response 1320.

Figure 14:
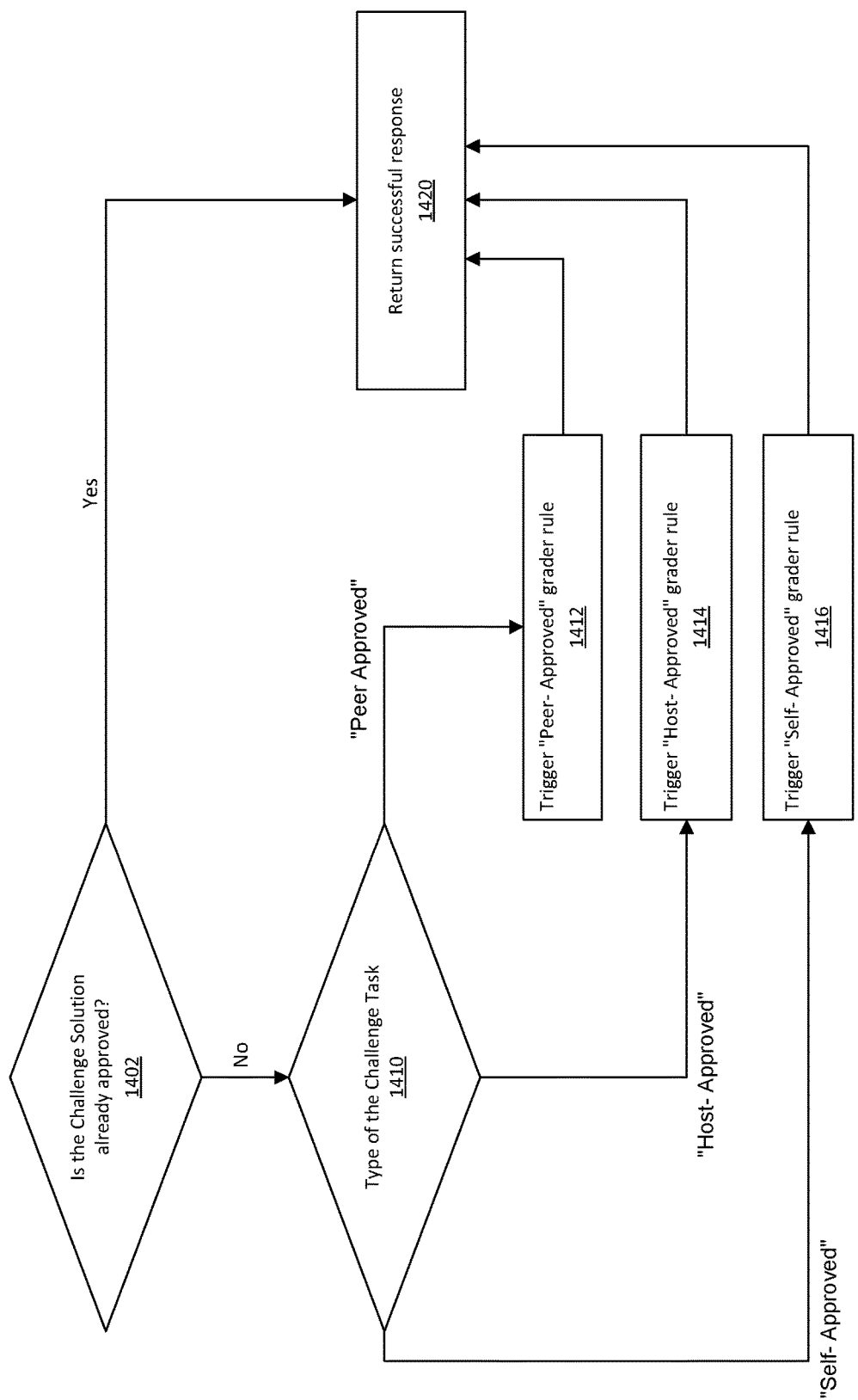
FIG. 14 is a flowchart illustrating an example operation of the Challenge Solution Grader from FIG. 1.
Figure 16:
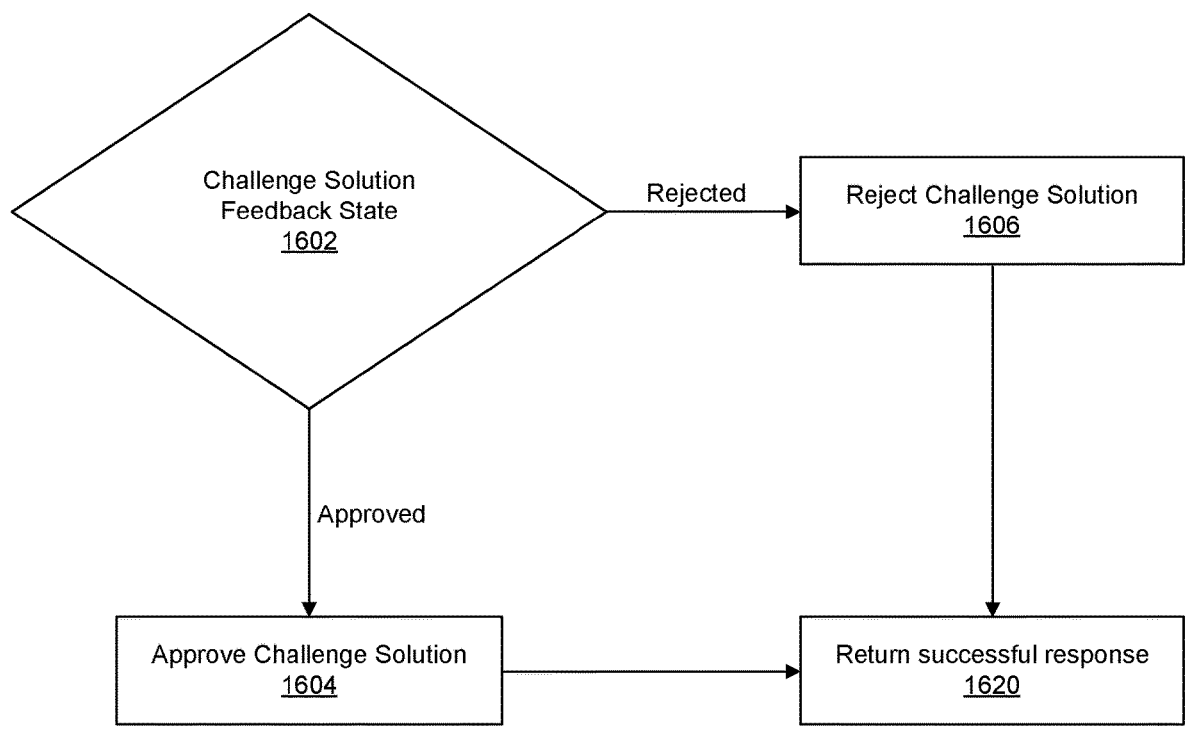
FIG. 16 is a flowchart illustrating example operation of a rule for grading Host-Approved challenges.

FIG. 14 is a flowchart illustrating an example operation of the Challenge Solution Grader triggered in FIG. 13. The grader itself is responsible for determining the right grader rule or grader rules that should be executed to grade the challenge solution. For example the first step of the grader is to actually check if the challenge solution is already approved 1402. If the Solution is approved, there is no need for any grader rule to be executed and the grader returns successful response 1420. Otherwise, if the Solution is still not approved, the type of the Challenge for which this Solution is submitted, will be checked. In the simplified example of the Grader, only that challenge type will be needed for the correct grader rule to be selected. For example, if the Challenge was of type Host-Approved, as in FIG. 2, this will trigger the "Host-Approved" grader rule 1414. FIG. 16 is a flowchart of an example implementation for that Host-Approved grader rule. The three types of challenge tasks are displayed in FIG. 14, and each type will result in triggering a grader rule for the specific type ("Peer-Approved" 1412, "Host-Approved" 1414, "Self-Approved" 1416). After the grader rule is executed, the assumption is that the grader itself has done its job, so the Grader 122 will return successful response 1420.

Figure 15:
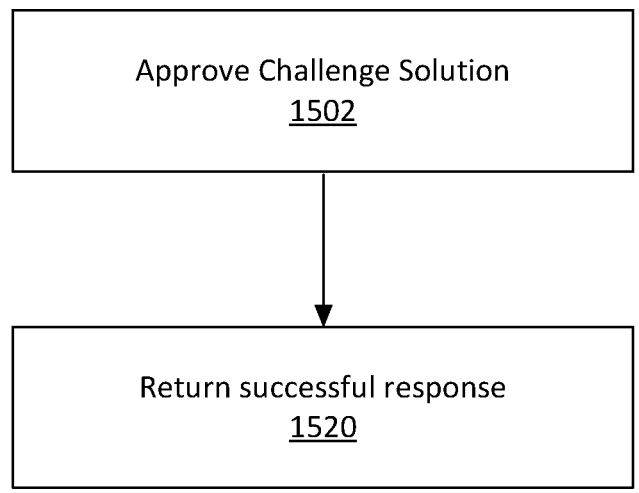
FIG. 15 is a flowchart illustrating example operation of a rule for grading Self-Approved challenges.

FIG. 15 is a flowchart illustrating an example operation of the Self-Approved grader rule. This is the simplest grader rule in the example system. A self-approved challenge solution will be approved on submission by the Learner. The operation of the Grader Rule is as simple as just Approving the Challenge Solution 1502 and returning a successful response 1520.

FIG. 16 is a flowchart illustrating example operation of a rule for grading Host-Approved challenges. This grader rule will be triggered when a feedback is submitted for a challenge solution that is related to a challenge of type Host-Approved. In the example the feedback should be submitted by the Host/Instructor 102. As already discussed, the Feedback itself is a Content Item 135 with associated State 135. The Grader Rule will determine whether to approve or reject the Challenge Solution based on the Feedback submitted 1602. If the feedback is Rejected then the challenge solution will be rejected as well 1606. Otherwise if the feedback is with State Approved the Challenge Solution will be approved 1604. As a final step the Grader will return a successful response 1620.

Figure 17:
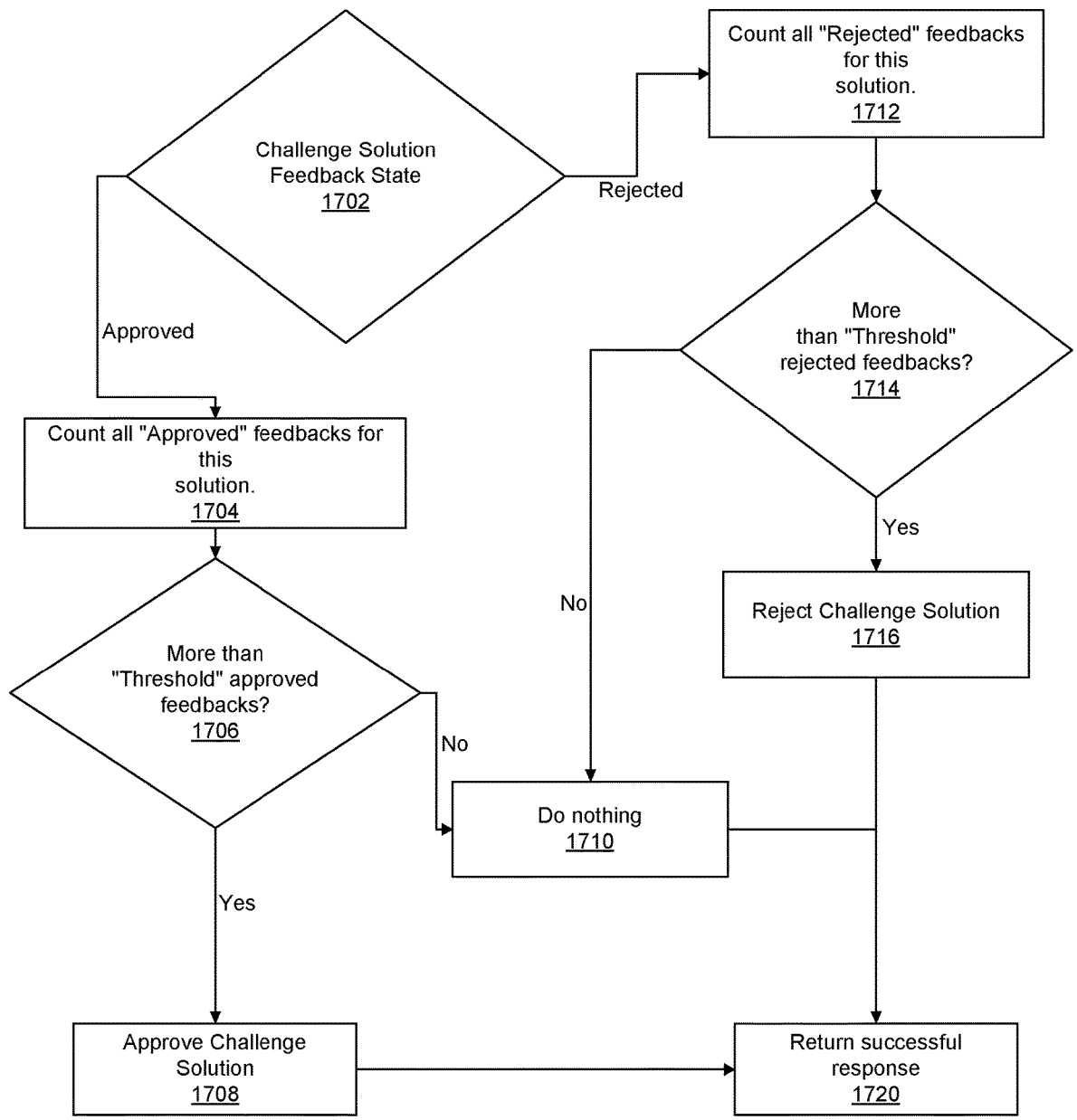
FIG. 17 is a flowchart illustrating example operation of a rule for grading Peer-Approved challenges.

FIG. 17 is a flowchart illustrating example operation of a rule for grading Peer-Approved challenges. This Grading Rule is shown as the most complex rule in the example. The first step of the execution process for this rule is to check if the submitted feedback is approved or rejected, based on the State of the Challenge Solution Feedback item 1702. For both cases, the grader assumes there are previous feedback items for this Challenge Solution. The grader will count all feedbacks with state Approved or Rejected so far 1704, 1712 and then determine if the number of feedbacks are above a given threshold 1706, 1714. Based on the state of the initial feedback that triggered the grader and if the number of feedbacks so far from this state are above the threshold, this grader will have to either Approve 1708 (if the feedback was with state Approve) or Reject 1716 (if the feedback was with state Reject) the Challenge Solution. In the example diagram the grader will Do Nothing 1710 when the number of feedbacks from a given state is below the threshold. At the end of its execution the grader will return Successful Response 1720.

Figure 18:
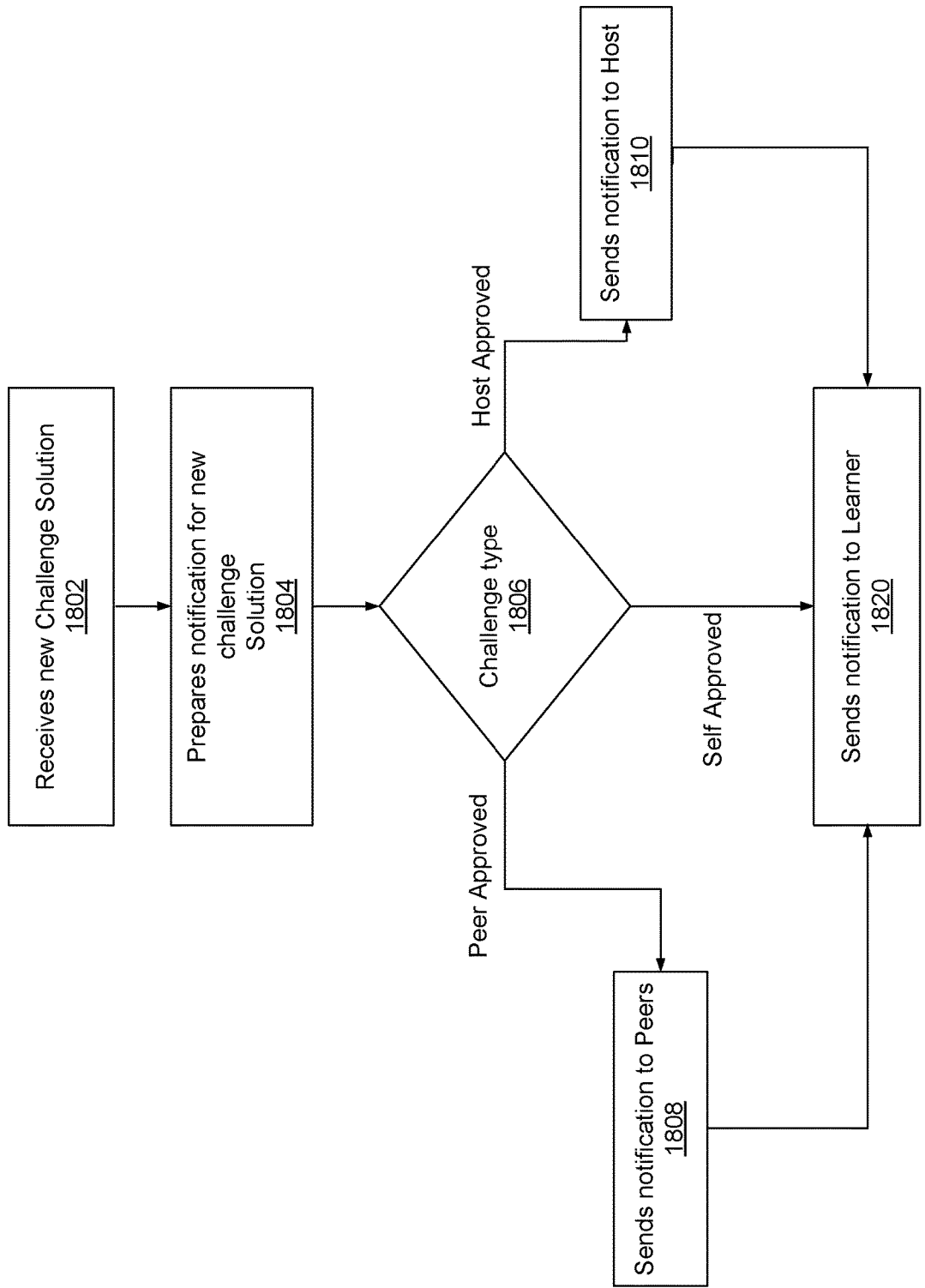
FIG. 18 is a flowchart illustrating example operation of the New Challenge Solution Notifier defined in FIG. 1 and Triggered in FIG. 12.

FIG. 18 is a flowchart illustrating example operation of the New Challenge Solution Notifier defined in FIG. 1 and Triggered in FIG. 12. The New Challenge Solution Notifier is used to notify all users that are concerned with a new challenge solution being submitted. In the example diagram the users are determined based on the type of the Challenge. Before a notification can be sent, one needs to be prepared from the received Challenge Solution 1804. The next step of execution of the notifier is to determine and gather the users that need to be notified based on a check for the Challenge Type 1806. If the challenge type is Peer Approved, the prepared notification is sent to the Peers 1808. If the challenge type is Host Approved—the notification is sent to the Host 1810. As a final step a notification is sent to the Learner as well 1820. The learner will be the only recipient if the Challenge type is Self Approved.

Figure 19:
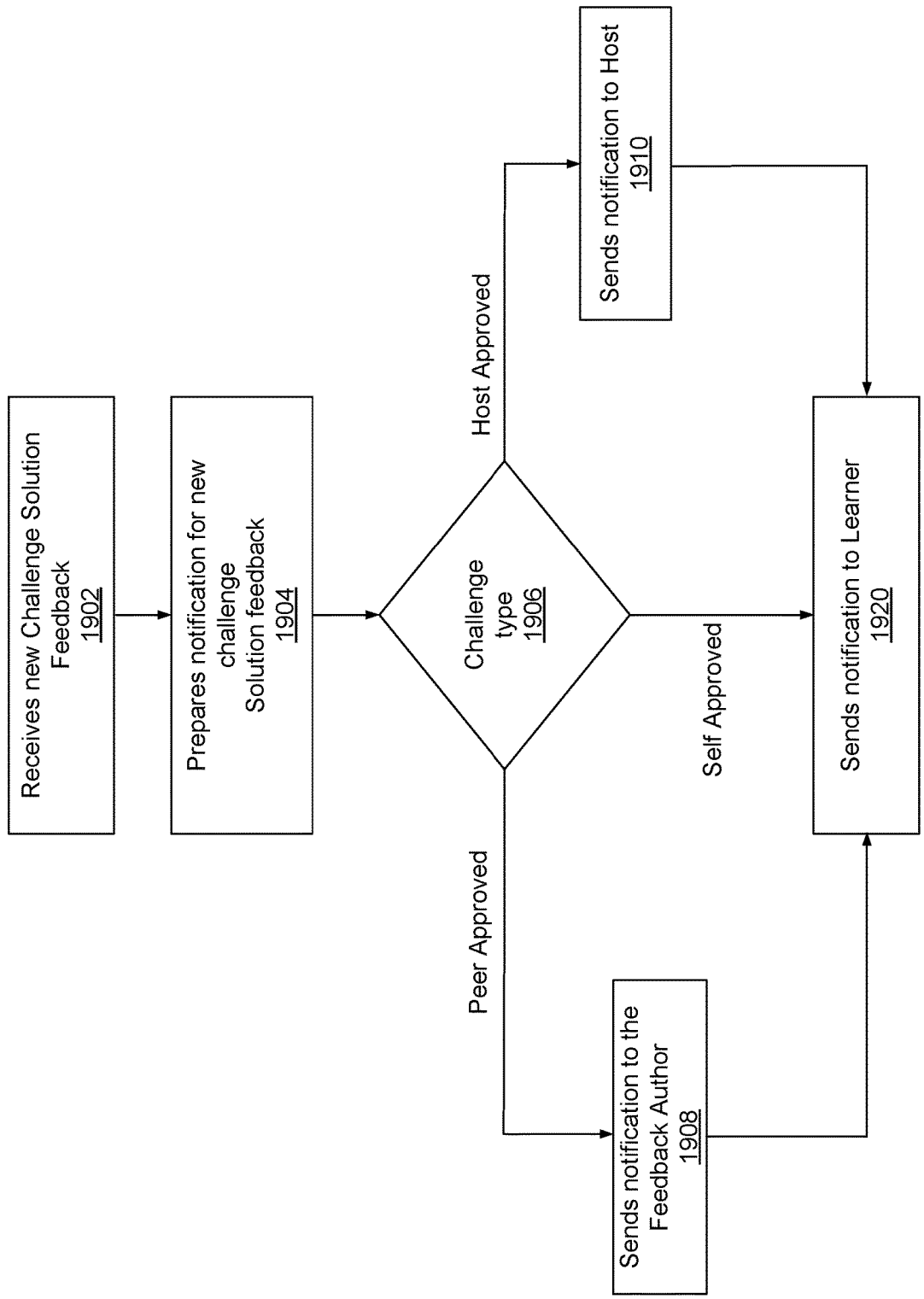
FIG. 19 is a flowchart illustrating an example operation of the New Challenge Solution Feedback Notifier defined in FIG. 1 and triggered in FIG. 12 and FIG. 13.

FIG. 19 is a flowchart illustrating an example operation of the New Challenge Solution Feedback Notifier defined in FIG. 1 and Triggered in FIG. 12 and FIG. 13. The new Challenge Solution Feedback notifier is similar to the New Challenge Solution notifier from FIG. 18. A new notification will be prepared in step 1904 and it will be delivered to the users. In the example, the set of users for which this notification will be delivered is determined based on the challenge type 1906. If the Challenge is of type Peer Approved, the notification will be delivered to the Feedback Author 1908 and the Learner 1920. If the Challenge is Host approved, this notification will be delivered to the Host 1910 and the Learner 1920. When the Challenge type is Self Approved, the notification will be delivered only to the Learner 1920.

Figure 20:
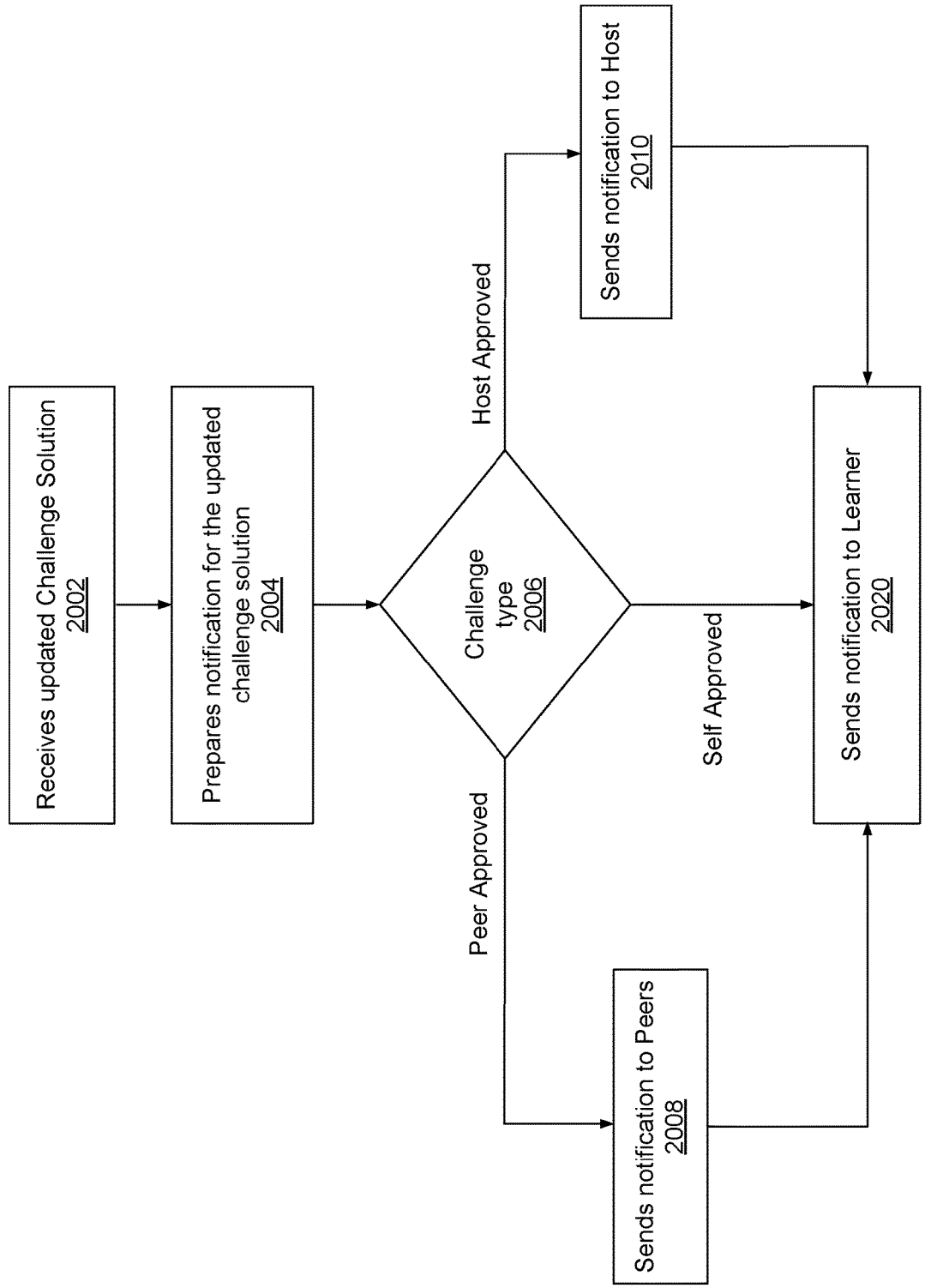
FIG. 20 is a flowchart illustrating an example operation of the Challenge Solution Changed Notifier defined in FIG. 1 and triggered in FIG. 12 and FIG. 13.

FIG. 20 is a flowchart illustrating example operation of the Challenge Solution Changed Notifier defined in FIG. 1 and Triggered in FIG. 12 and FIG. 13. This notifier is triggered whenever the state of a given challenge solution is changed. The main goal of this notification is to notify all users that the Challenge Solution was updated. In our example this notifier works similarly to the New Challenge Solution Notifier. First the Challenge Solution is received 2002 and a notification is being prepared 2004. Once again, the set of users for which the notification should be delivered is determined by the Challenge Type 2006. If the challenge is of type Peer-Approved, the notification will be delivered to the Peers 2008 and the Learner 2020 who submitted the Solution. For Host-Approved Challenges, the notification will be delivered to the Host 2010 and to the Learner 2020. In the example we have Self-Approved challenges, for which the notification will be delivered only to the Learner 2020.

The described platforms for evaluating hands-on learner's subject comprehension provides not only a way for the learners to complete challenges, but also to provide various ways to evaluate the challenge submission and provide a unified feedback mechanism to the learners.

For small scale projects or projects which are hard to be evaluated in an automated way, an evaluation of challenges submissions can be done through manual reviews of a non-machinery third party. This can be done by either a person who already went through the same hands-on learning experience or by a subject matter expert or by any other certified personnel. As this solution of manually evaluating the learners' subject comprehension in a hands-on learning environment may work for certain small scale groups or specific knowledge domains, it would be very hard and sometimes impossible to work at a scale of thousands or millions of simultaneous hands-on learners' submissions from both cost and time perspective. Providing an automated and still versatile solution of machinery autograding feedback is a very technically challenging task. There are multiple technical challenges in providing a unified submission feedback mechanism for both machinery and manual evaluation of learners' subject comprehension in a hands-on learning environment. To understand the technological complexity of the feedback mechanism it is useful to better understand specific examples of the hands-on learning environment.

In the first phase of a hands-on learning experience is creating the experience itself. There are at least two steps: first, preparation of the interactive hands-on environment (referred to herein as a cloud workspace) and second, creating and/or providing the learning materials using the cloud workspace. If one wants to add an automated evaluation system (such as the autograders described herein) that automates the evaluation of the learner subject comprehension, then there is a third step of implementing and/or integrating an autograder solution. This autograder can be integrated directly into the cloud workspace or hosted externally from the cloud workspace. Most of the hands-on experiences are unique with their environment settings, subject requirements, and desired outcomes. Adding an autograder makes it very technologically complex to make a unified feedback mechanism for multiple hands-on learning experiences of different subjects and requirements to use and/or reuse the same autograder as well as integrating various autograding solutions, while providing a unified way to display a feedback from them.

The second phase is consuming the provided hands-on learning experience from the learners. During this phase the platform needs to provide a systematic way for the learners to acquire the knowledge and skills rendered in the project and at the same time gather as much information as possible from learners to provide a rich and easy-to-process input from both machinery and non-machinery solution evaluation systems. Gathering and encoding the user input in a way to be able to process by both machinery and non-machinery solution grading systems is a technically challenging task, because the different parties have different requirements for information structure.

For example, in the case of a human review the reviewer may need visual material (images, video) displaying the learners' solution to a challenge to evaluate the solution based on her knowledge and skills. In the case of machinery grading solution, depending on the requirements, the different autograder providers may need various inputs such as, but not limited to keyboard, mouse, user video, user audio, cloud workspace screenshots, screen recordings, files, processes list and processes logs. All these inputs need to be encoded, stored and provided in a deterministic and documented way so the grading parties can process them in a unified way.

FIG. 21 is a block diagram of a system illustrating an example architecture for evaluating learners' subject comprehension through challenges using machinery and non-machinery feedback. FIG. 21 illustrates example building blocks of such a system, including a Client Platform 2102, Hands-on Learning Platform 2104, Cloud Provider 2106, and External Autograder 2108. The following description describes examples of sub-modules and services of each of the above-mentioned main building blocks. A more detailed description follows in each detailed description of the following diagrams and figures.

In the example of FIG. 21, the Client Platform 2102 runs on at least one computing device with computer-readable storage medium. Of course, as is apparent, the at least one computing device is intended as a highly simplified representation of the types of computing devices that may be utilized to provide the Client Platform 2102 and therefore does not explicitly illustrate various known hardware/software components that may be utilized in the various implementations of the system.

The Client Platform 2102 may be configured to pull the user interface produced by the UI Generator 140 of the content platform 110, as shown in FIGS. 1 and 21, through the Content Stream Synchronizer 2110, gather Content Items from the Content Hierarchy 130 provided by the Content Platform 110 through the Content Communication Controller 2112, extract the content materials through the Content Extractor 2114, and render the extracted content via the Content Renderer 2116.

The Client Platform 2102 may also be configured to request and wire access to a Cloud Workspace 2118 through a Cloud Workspace Access Controller 2120. The Client Platform 2102 may also be configured to use client device capabilities to gather various user inputs through Client Device Input Controller 2122. The Client Platform 2102 may also be configured to then synchronize the user input through User Input Stream Synchronizer 2124.

The Client Platform 2102 may also be configured to utilize the user input to provide access and control to the Cloud Workspace 2118 through the Cloud Workspace Controller 2128, render the output of the Cloud Workspace 2118 through Cloud Workspace Renderer 2126, encode and record various user inputs (e.g., through User Audio Codec 2130, User Video Codec 2132, Keyboard Codec 2134 and Cursor Codec 2136), and record the produced output streams of the cloud workspace output together with the user interaction through the Challenge Solution Recorder 2138. The Client Platform 2102 may also be configured to send the challenge solution recorded data with the Content Platform 110 through Challenge Solution Communication Controller 2140, receive any relevant messages including but not limited to challenge solution grader feedback through the Notification Controller 2142, process and prepare the grader feedback through Grader Feedback Processor 2144, and render the processed grader feedback through Grader Feedback Renderer 2146.

The Hands-on Learning Platform 2104 runs on at least one computing device with computer-readable storage medium. Of course, as is apparent, the at least one computing device is intended as a highly simplified representation of the types of computing devices that may be utilized to provide but not limited to the Content Platform 110, Cloud Workspace Lifecycle Service 2148, Messaging Service 160, Autograder Control Service 2150 and therefore does not explicitly illustrate various known hardware/software components that may be utilized in the various implementations of the System.

The Hands-on Learning Platform 2104 functionalities include interacting with the Client Platform 2102 to provide and control various inputs and outputs, such as, but not limited to, Content Items (e.g., content items 134, 136 of FIG. 1) through the Content Platform 110. The Hands-on Learning Platform 2104 may also be configured to control the lifecycle and access to the Cloud Workspace 2118 through the Cloud Workspace Lifecycle Service 2148, interact and exchange data with the Cloud Workspace 2118 through the Content Platform 110, and control and organize the flow and evaluation of challenge submissions. The Hands-on Learning Platform 2104 may also be configured to trigger any relevant autograding evaluation through the Autograder Control Service 2150, e.g., from grader rule 124 of the challenge solution grader 122 of FIG. 1. The Hands-on Learning Platform 2104 may also be configured to control user subscription and provide messaging for any relevant messages to the learner through the Messaging Service 160 (including, but not limited to, challenge submission feedbacks).

The Autograder Control Service 2150 is described in more detail, below, with respect to FIG. 23. In general, as referenced above and illustrated in FIG. 21, the Autograder Control Service 2150 may be configured to be triggered by the grader rule 124 or other input to initiate action of the external autograder 2108 or the cloud workspace hosted autograder 2154. The Autograder Control Service 2150 may be configured to access challenge solution storage 154 for the appropriate challenge solution and access user input storage 2156 for a capture of provided user input. Once autograding is completed, the Autograder Control Service 2150 may be configured to provide feedback in the context of the challenge solution within Challenge Solution Feedback Storage 2158.

The Cloud Provider 2106 runs on at least one computing device with computer-readable storage medium. Of course, as is apparent, the at least one computing device is intended as a highly simplified representation of the types of computing devices that may be utilized to provide but not limited to the Cloud Workspace 2118 and therefore does not explicitly illustrate various known hardware/software components that may be utilized in the various implementations of the System.

The Cloud Provider 2106 main responsibilities include handling requests from the Cloud Workspace Lifecycle Service 2148 for all actions and processes related to the Cloud Workspace lifecycle, such as, but not limited to, creating, pausing, saving the state, moving, restarting, changing configuration and terminating a Cloud Workspace 2118. The Cloud Workspace 2118 may host a Cloud Workspace Input Collector 2152 with a main responsibility to gather relevant input from the Cloud Workspace configuration (such as, but not limited to, file changes, process list changes, process logs, and any software configuration changes). The Cloud Workspace Input Collector 2152 encodes the gathered information and may provide it to the Content Platform 110 to enrich the gathered data, e.g., as part of a challenge submission.

The Cloud Provider 2106 may also host an autograder shown in FIG. 21 as Cloud Workspace Hosted Autograder 2154. The Cloud Workspace Hosted Autograder 2154 may utilize computing resources of the Cloud Workspace 2118 to, e.g., evaluate the learner's challenge submission. Apart from the benefit of sharing and distributing the computations for the challenge submission evaluation, the Cloud Workspace Hosted Autograder 2154 benefits from the already set-up configuration on the Cloud Workspace 2118.

The External Autograder 2108 runs on at least one computing device with computer-readable storage medium. Of course, as is apparent, the at least one computing device is intended as a highly simplified representation of the types of computing devices that may be utilized to provide an external solution for autograding and therefore does not explicitly illustrate various known hardware/software components that may be utilized in the various implementations of the System.

The External Autograder 2108 may be configured to handle all the learner's data generated by the Client Platform 2102 and processed by the Content Platform 110. The External Autograder 2108 may also be configured to process the data to produce a valuable challenge solution feedback for learner challenge submission. The External Autograder 2108 may be hosted externally from the System.

Further, although the System is illustrated as including a number of separate, discrete components, it will be appreciated that any two or more components or sub-components may be combined for operation of the single component, while, conversely, a single component may have two or more of its functions implemented using two or more separate components.

In various embodiments, the system may be implemented in an architecture in which at least one computing device represents one or more back-end devices (e.g. web server, application server, or database system) that are configured to store, maintain and process data. As with most such back-end/frontend architectures, a manner and extent to which various features and functionalities are provided using the backend, as opposed to the front-end, may be at least partially configurable.

Figure 22:
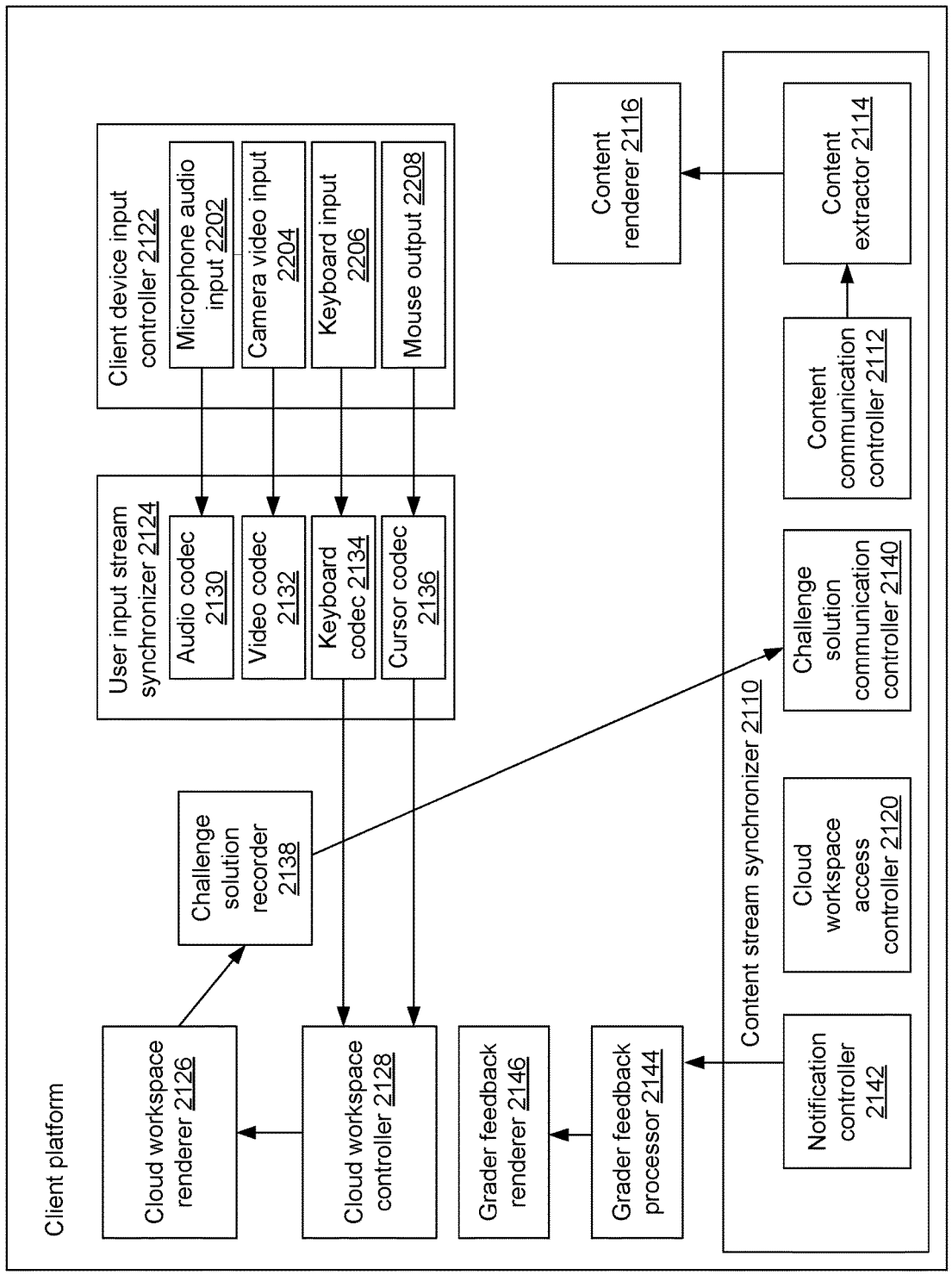
FIG. 22 is a block diagram illustrating an example version of the Client platform of FIG. 21.

FIG. 22 is a block diagram showing an example structure of the Client Platform 2102. The Client Platform 2102 is a composition of multiple submodules whose main role is to provide the user experience for the hand-on learning and collect various metrics and inputs from the learner which later are used to evaluate the learner's subject comprehension. Once the learner enters a project for a given subject, the Client Platform 2102 pulls the user interface and the project's content from the Content Platform's UI Generator as shown in FIG. 1. Once the data is pulled the Client Platform 2102 renders the user interfaces. The Client Platform 2102 uses the content data and pulls the Content Items materials through the Content Extractor 2114. Then the materials are rendered through the Content Renderer 2116.

The Client Platform 2102 uses the Cloud Workspace Access Controller 2120 to request and wire an access to the pre-configured Cloud Workspace 2118. The Client Platform 2102 requests an access to various client input devices, e.g., including but not limited to Microphone Audio Input 2202, Camera Video Input 2204, Keyboard Input 2206, and Mouse Input 2208. These inputs may be leveraged for multiple purposes.

For example, such purposes may include controlling the Cloud Workspace through the encoding and synchronizing of the streams through the User Input Stream Synchronizer 2124 and providing the input to the Cloud Workspace Controller 2128. The Cloud Workspace Controller 2128 allows direct interaction with the Cloud Workspace 2118 as well as controls the output rendering of the Cloud Workspace environment through the Cloud Workspace Renderer 2126.

In a challenge task the learner is instructed to show learned skills and knowledge. During the challenge solution the learner actively interacts with the Cloud Workspace 2118 through the above-mentioned components. The Challenge Solution Recorder 2138 records the user inputs through the User Input Stream Synchronizer 2124 as well as the configured output from the Cloud Workspace 2118 through the Cloud Workspace Renderer 2126.

Once the learner submits the solution, the Challenge Solution Recorder 2138 sends the recorded data to the Content Platform 110 as well as a request for challenge solution evaluation through the Challenge Solution Communication Controller 2140. Once the solution is evaluated a unified feedback is provided to the learner by the Content Platform 110 through the Client's Platform Notification Controller 2142. The feedback is processed by the Grader Feedback Processor 2144 and displayed through the Grader Feedback Renderer 2146.

Figure 23:
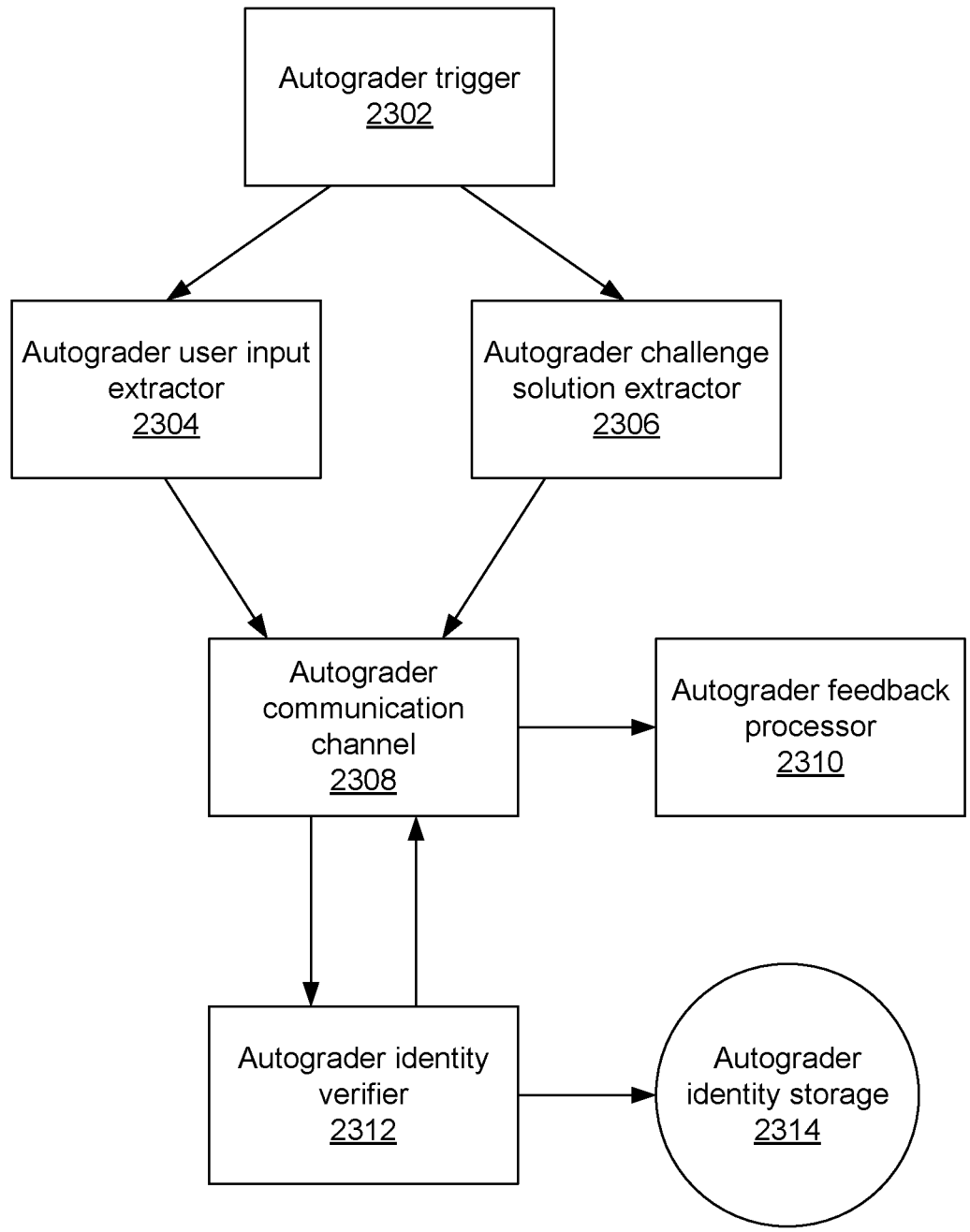
FIG. 23 is a block diagram illustrating the Autograder Control Service of FIG. 21.

FIG. 23 is a block diagram showing the general structure of the Autograder Control Service 2150 of FIG. 21. As described above, the Autograder Control Service 2150 may be triggered when the Challenge Solution Handler 112 or the Challenge Solution Feedback Handler 120 invokes an Autograder Trigger 2302 in response to a new autograder approved challenge solution being submitted.

The Autograder Trigger 2302 invokes an Autograder User Input Extractor 2304 and an Autograder Challenge Solution Extractor 2306 to pull the solution data and its relevant user input data respectively from the Challenge Solution Storage 154 and the User Input Storage 2156. The data is then processed and sent to the configured autograder via Autograder Communication Channel 2308. The communication between the Autograder Control Service is secured and authorized by the Autograder Identity Verifier 2312, which authorizes the selected autograder to receive and process the data. The identity information for each configured autograder is stored within the Autograder Identity Storage 2314. Once the configured autograder responds with the solution feedback an Autograder Feedback Processor 2310 processes the data to unify it with the rest of the grading feedbacks and sends it to the Content Platform 110 through the Challenge Solution Feedback Handler 120 to be stored within the Challenge Solution Feedback Storage 2158 of FIG. 21. Once stored, the Challenge Solution Feedback Handler 120 generates a new message and sends it to the Client Platform 2102 through the messaging service 160.

In more specific examples, when the Autograder Control Service 2150 is triggered, e.g., by a grading rule 124 of the Challenge solution grader 122 on the Content Platform 110, the Autograder Control Service 2150 may proceed to gather information for the challenge submission by various extracts. Such extracts may include, by way of example and without limitation, the following types of extracts.

For example, such extracts may include use of the Autograder user input extractor 2304, which may be configured, e.g., to provide data for the user keyboard input recorded during a challenge submission. The Autograder challenge submission extractor 2306 may be configured to provide data in a video (and/or audio) format for the recorded screen of the Cloud Workspace 2118, which may also include microphone recording of the learner during the challenge submission.

In other examples, a file watcher process may extract data related to changes of digital files on the Cloud Workspace recorded during the challenge submission. Somewhat similarly, a process watcher may be configured to extract data related to changes in processes states on the Cloud Workspace 2118 recorded during the challenge submission.

Once the extracted data is gathered then it may be encoded in a common interface format by the Autograder Communication Channel 2308 and sent to the configured grading solution. For example, the Autograder Control Service 2150 may be configured to provide the extracted data from the Challenge Submission in a standardized JavaScript Object Notation (JSON) format.

The resulting document includes but is not limited to several meta mandatory fields. The mandatory fields may include the following fields. For example, a version field of type string may be used to define the format and the structure of the document. A challenge submission Id field of type string may be used to provide a unique identifier of the learner challenge submission. A CreatedAt field of type timestamp may be configured to provide a timestamp of the creation of the learner challenge submission. A ChallengeId field of type string may be used to provide a corresponding unique identifier of the challenge.

A PayloadVersion of type string may be used to define a version of the Payload field format. The version defines a set of documented rules for constructing the structure, fields and encoding of the payload.

A Payload field of type JSON may be used to provide extracted learner submission data for grading. The payload represents a nested document that includes the actual submission extracted payload from the hands-on platform. The payload may include but not limited to several different fields:

KeyInputStream, which may be of type any, may be provided using JSON/B SON or any other suitable document format. The actual type is defined by the parent field PayloadVersion, and represents a stream of keyboard input data recorded during the challenge submission. VideoURL, which may be of type string, may represent a Uniform Resource Identifier (URI) of the recorded video of the challenge submission. FileWatcherStream, which may be of type any, may be JSON/B SON or any other suitable document format. The actual type is defined by the parent field Payload Version, and represents a stream of data related to changes of digital files on the Cloud Workspace recorded during the challenge submission. ProcessWatcherStream, which may be of type any, may be JSON/BSON or any other suitable document format. The actual type is defined by the parent field PayloadVersion, and represents a stream of data related to changes in processes states on the Cloud Workspace recorded during the challenge submission.

Each of the fields and corresponding data within the Payload fields is optional, but at least one of the fields may be presented so the graders can assess the data and respond with feedback. Once the grader(s) assess the data, they return a response to the Autograder Control service 2150 in a standardized JSON format. The document may include, without limitation, several fields.

These fields may include, for example, an AutograderId field of type string that defines a unique identifier of the autograder sending the response. A field CreatedAt of type timestamp may provide a timestamp for the assessment result.

A field score of type number may provide a score of the assessment. For example, a negative number may represent an error on the autograder side. A score of zero may indicate that the submission does not comply with the rules of the grading solution. Any positive number between 1-100 represents either a partial or full success of the submission. A feedback field of type string may provide text describing the score number.

Once the Autograder 2108 or 2154 receives the feedback from the grading solution it processes the response through the Autograder feedback processor. The solution may be formatted in a compatible manner to enable storage by the Challenge solution feedback storage 2158.

Figure 24:
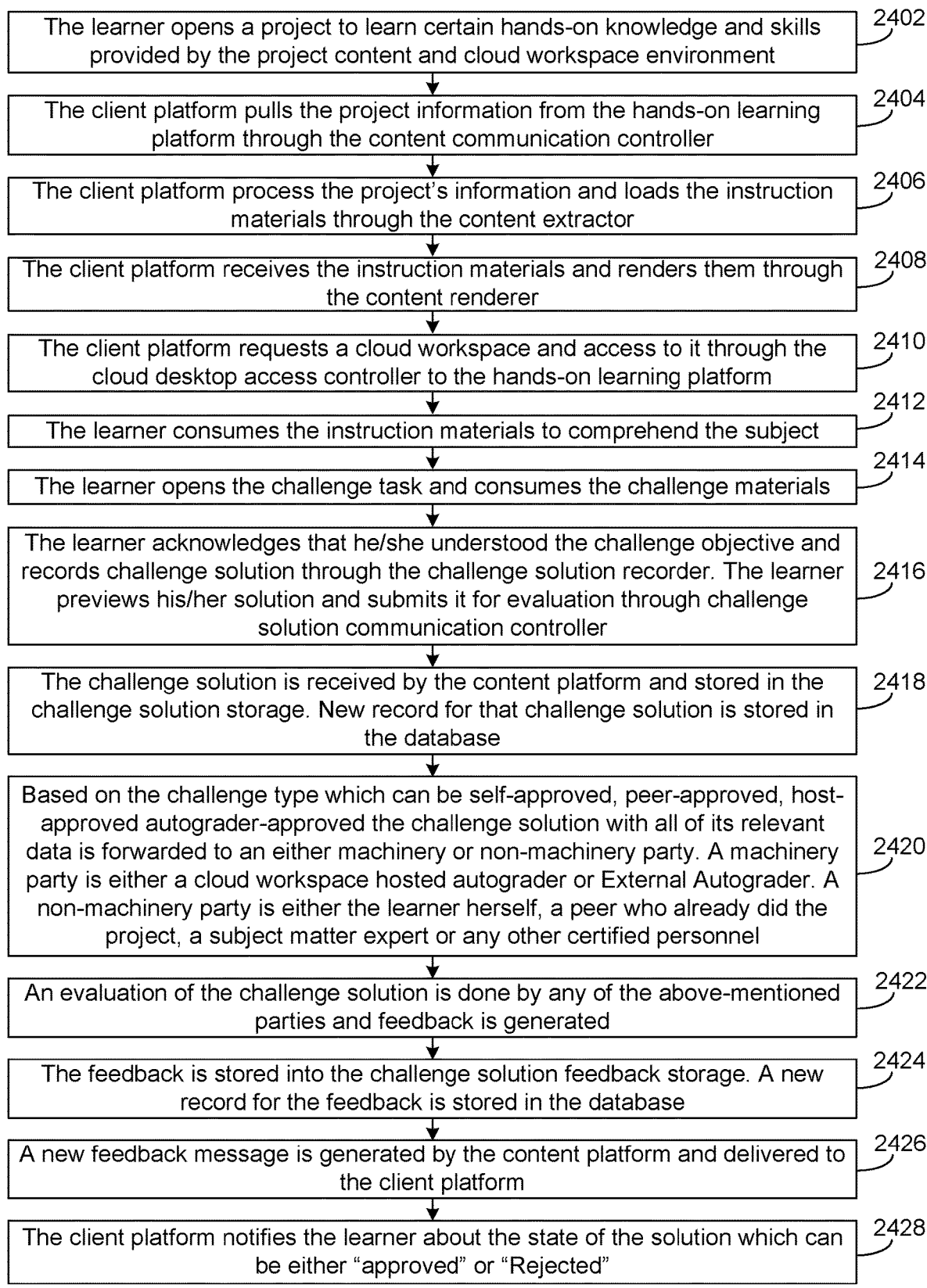
FIG. 24 is a flowchart illustrating example operations of the system of FIG. 21.

FIG. 24 is a flowchart illustrating example operations of the system of FIG. 21. In FIG. 24, the learner opens a project to learn certain hands-on knowledge and skills provided by the project content and cloud workspace environment (2402). The Client Platform 2102 pulls the project information from the Hands-on Learning Platform 2104 through the content communication controller (2404).

Then, the Client Platform 2102 processes the project's information and loads the instruction materials through the content extractor (2406). The Client Platform 2102 receives the instruction materials and renders them through the content renderer (2408). The Client Platform 2102 requests a cloud workspace and access to it through the cloud desktop access controller to the Hands-on Learning Platform 2104 (2410).

The learner consumes the instruction materials to comprehend the subject (2412). The learner opens the challenge task and consumes the challenge materials (2414). The learner acknowledges that he/she understood the challenge objective and records challenge solution through the challenge solution recorder. The learner previews his/her solution and submits it for evaluation through challenge solution communication controller (2416)

The challenge solution is received by the content platform and stored in the challenge solution storage. A new record for that challenge solution is stored in the database (2418).

Based on the challenge type which can be self-approved, peer-approved, host-approved autograder-approved the challenge solution with all of its relevant data is forwarded to an either machinery or non-machinery party. A machinery party is either a cloud workspace hosted autograder or External Autograder 2108. A non-machinery party is either the learner herself, a peer who already did the project, a subject matter expert or any other certified personnel (2420).

An evaluation of the challenge solution is done by any of the above-mentioned parties and feedback is generated (2422). The feedback is stored into the challenge solution feedback storage. A new record for the feedback is stored in the database (2424).

A new feedback message is generated by the content platform and delivered to the Client Platform 2102 (2426). The Client Platform 2102 notifies the learner about the state of the solution which can be either "approved" or "Rejected" (2428).

Figure 25:
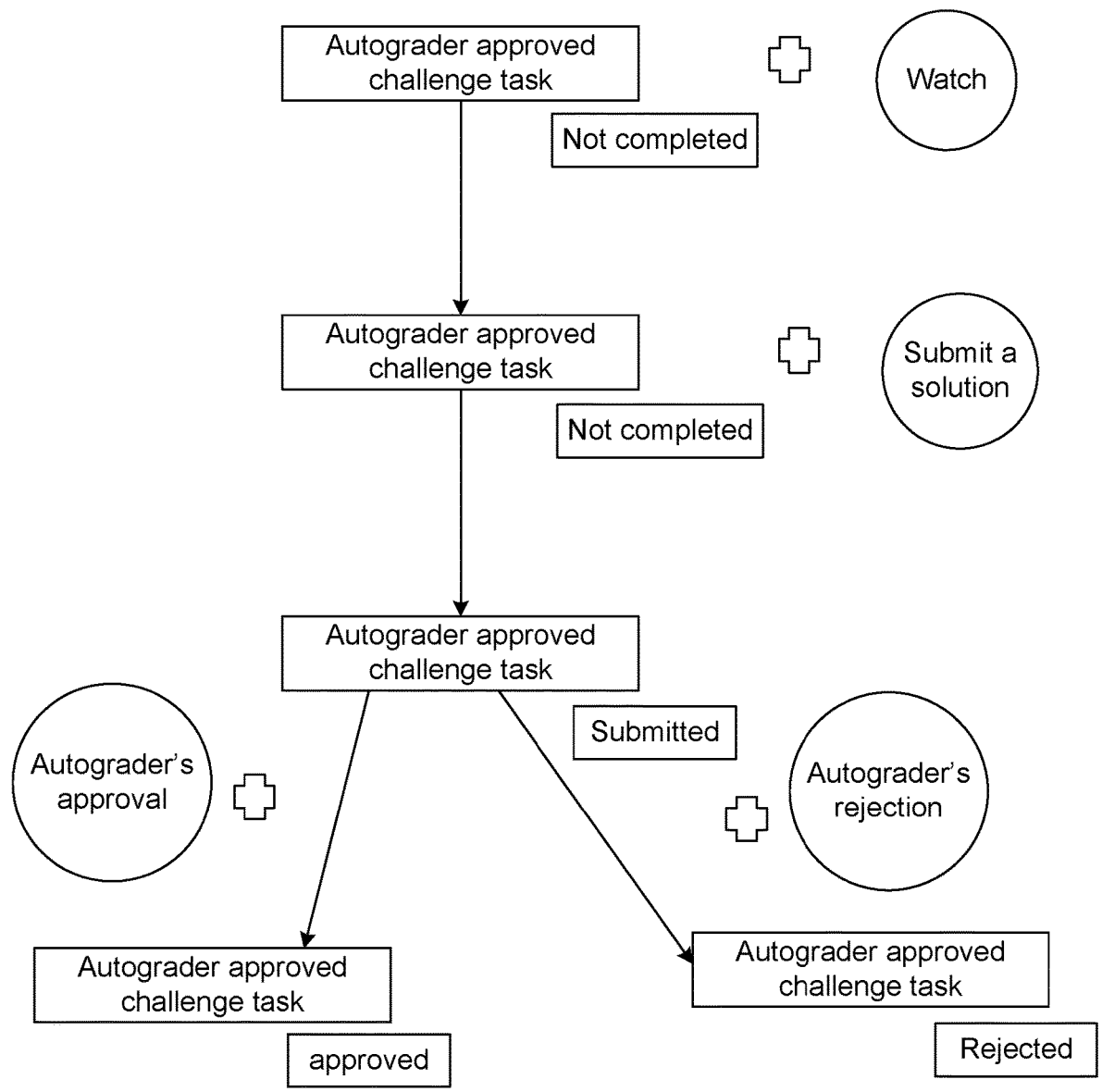
FIG. 25 is a block diagram illustrating the possible state changes for a challenge task of type autograder approved.

FIG. 25 is a block diagram illustrating the possible state changes for one of the challenge task types described herein: an autograder approved challenge task. The illustrated node illustrates an autograder approved challenge task associated with state "not completed". Similarly to FIG. 8, in response to an event "watch", the autograder approved challenge task doesn't have its state updated as illustrated by the node and its state. The reason is the same: the challenge tasks require additional actions from the learner in order to update the state of the challenge task. However, in the case of an autograder approved challenge, the "submit a solution" event is not enough to update its state to "approved". Instead, in response to a "submit a solution" event, the autograded approved challenge task has its state updated accordingly, as illustrated by the updated autograded approved challenge task and its associated state, which has a value of "submitted".

This event will also trigger the Challenge Solution Handler using the Autograder Trigger and will notify the configured autograder. The configured autograder can trigger two types of events: approve or reject, and can provide feedback to the learner. In response to a "autograder's approval" event, the autograder approved challenge task has its state updated accordingly, as illustrated by the updated host approved challenge task and its associated state, which has a value of "approved". In response to an "autograder's rejection" event, the autograder approved challenge task has its state updated accordingly, as illustrated by the updated autograder approved challenge task and its associated state, which has a value of "rejected".

These events which are a result of a review of a challenge solution will create a challenge solution feedback illustrated by node. The creation of such challenge solution feedback will also trigger the Challenge Solution Feedback Handler which will trigger the New Challenge Solution Feedback Notifier or the Challenge Solution state Changed Notifier.

As illustrated in FIG. 25, once a "autograder's rejection" event is triggered, "rejected" may not be the final state of the autograder approved challenge task. An example of a possible next flow is illustrated in FIG. 26.

Figure 26:
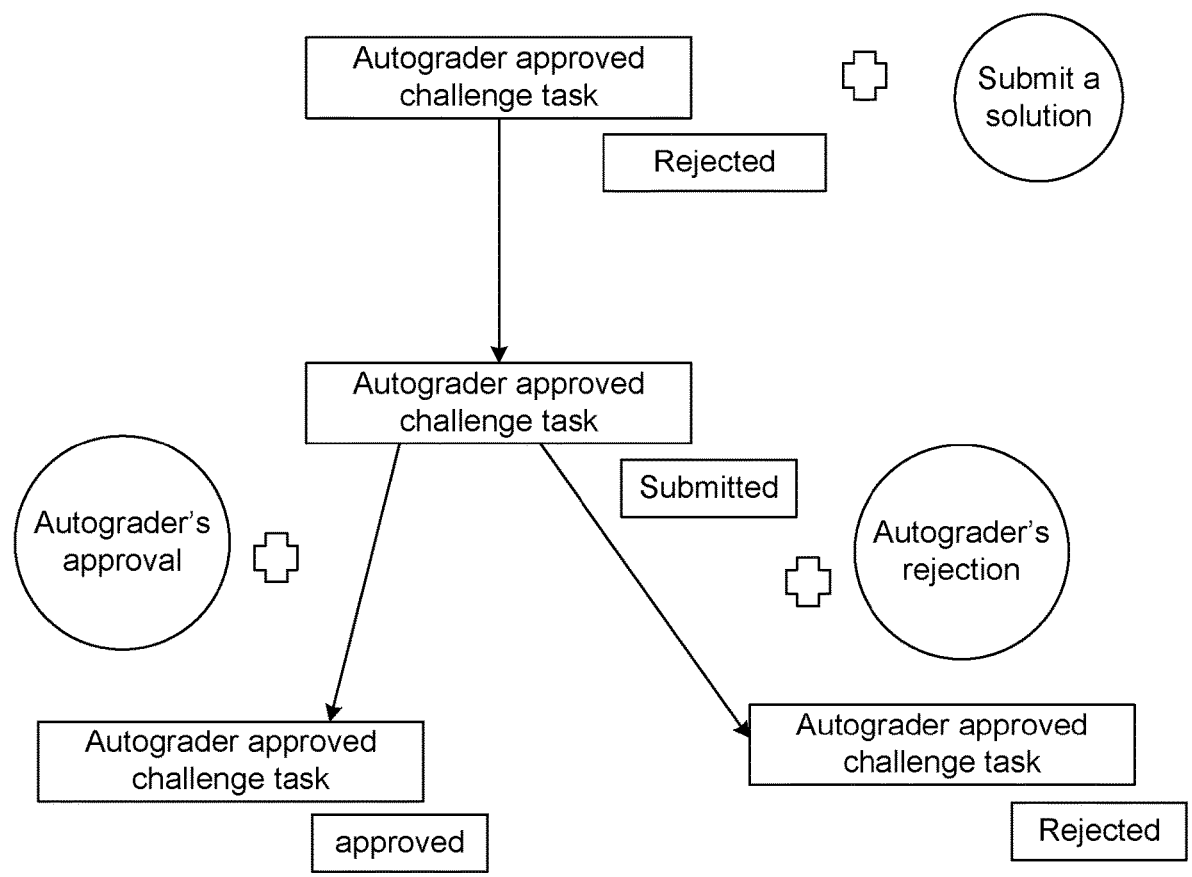
FIG. 26 is a block diagram illustrating the possible state changes for an autograder approved challenge task with an associated state "rejected" shown in FIG. 25.

FIG. 26 is a diagram illustrating an example of a possible flow after an autograder approved challenge task's state was updated to "rejected". Node illustrates a host approved challenge task with associated state "rejected". In this example, once an autograded approved challenge task is rejected by the autograder, the learner can submit a new solution addressing the feedback provided by the autograder as part of the "autograder's rejection" event from FIG. 25. In response to an event "submit a solution", the autograder approved challenge task has its state updated accordingly, as illustrated by the updated autograder approved challenge task and its associated state, which has a value of "submitted".

Similarly to the description of FIG. 25, this event will trigger the Challenge Solution Handler using the Autograder Trigger will notify the configured autograder. The next possible steps are the same for an autograder approved challenge task which has a state "not completed" or "rejected" in the previous step. As illustrated in this example, in response to an "autograder's approval" event, the autograder approved challenge task has its state updated accordingly, as illustrated by the updated host approved challenge task and its associated state, which has a value of "approved". In response to an "autograder's rejection" event, the host approved challenge task has its state updated accordingly, as illustrated by the updated autograder approved challenge task and its associated state, which has a value of "rejected".

The flow described by FIG. 25 can be repeated as many times as needed in order for the autograder approved challenge task's state to be updated to "approved," or can be ended by a rule. For example, such a rule can be that a learner can submit a new challenge solution after a rejection only N number of times. These rules can be much more complex as well.

The difference between non-machinery and machinery evaluations of challenges is that the non-machinery ones are reviewed by a human while the machinery ones are fully automated through various implementations of autograding solutions. Examples of machinery solutions that evaluate the learner's subject comprehension by various techniques can be but not limited to rule-based systems, statistical algorithms which either approve or reject the challenge solution based on some percentage of similarity to a known solution and neural networks that test the solution for similarities with well-known solution.

Figure 27:
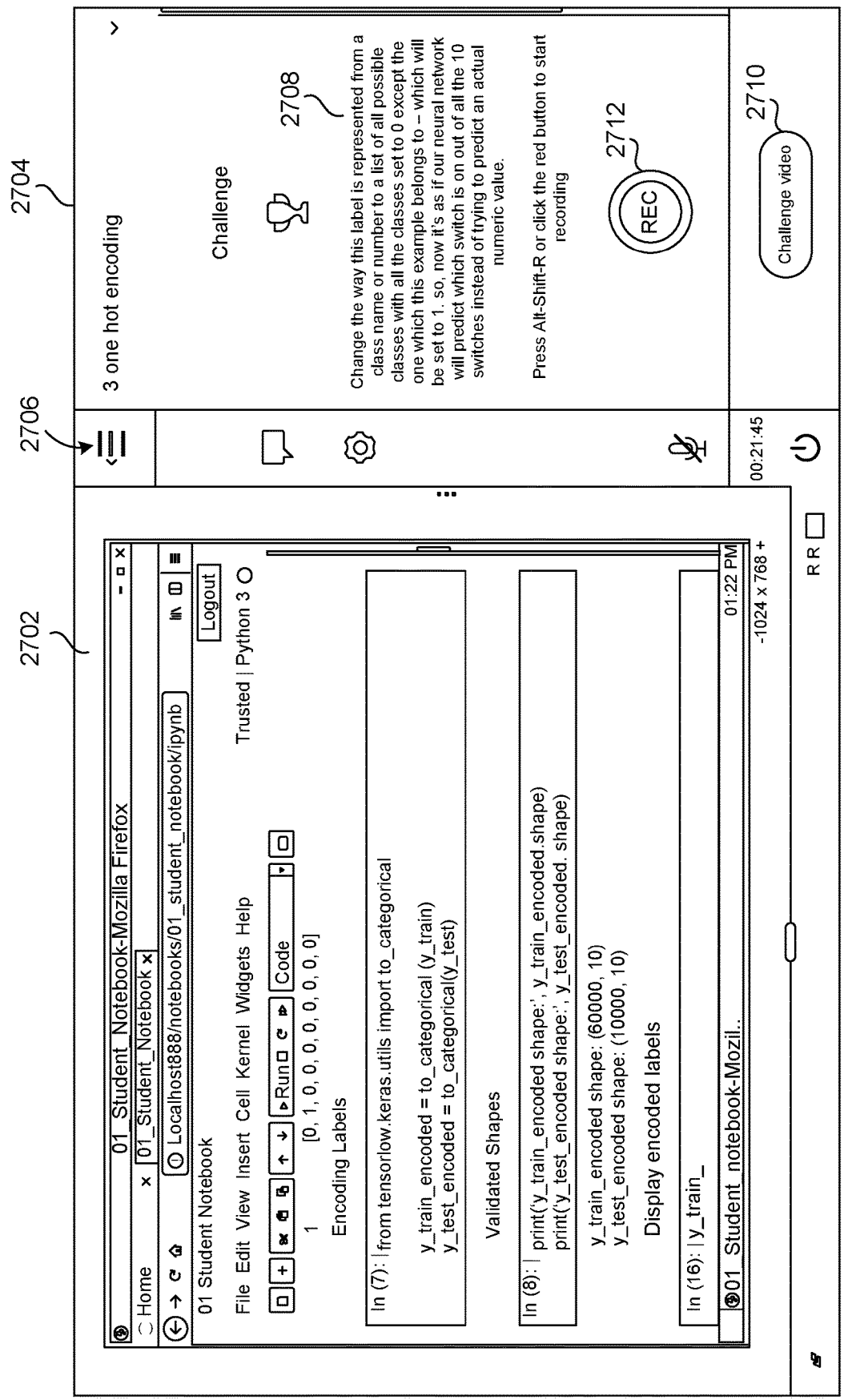
FIG. 27 is a screenshot of a Cloud Workspace Challenge View displaying a Cloud Workspace alongside a challenge description and a button for a learner to record the challenge.

FIGS. 27-31 are screenshots illustrating example implementations of the described systems and techniques of FIGS. 1-26. FIG. 27 is a screenshot of a Cloud Workspace Challenge View displaying a Cloud Workspace alongside a challenge description and a button for a learner to record the challenge.

In FIG. 27, a cloud workspace 2702 represents the type of interactive, preconfigured workspace described above, e.g., as Cloud Workspace 2118. A content view 2704 provides a view of, in the example, a challenge to be completed by a learner and graded by an autograder as described above.

As further illustrated, the cloud workspace 2702 includes controls 2706 that enable the learner to, e.g., interact with an instructor or another learner, or to otherwise configure or use the cloud workspace 2702. The content view 2704 provides the specific challenge description 2708. A record button 2712 enables to learner to record their challenge solution occurring within the cloud workspace 2702, after watching a challenge video 2710 detailing the challenge to be performed.

Figure 28:
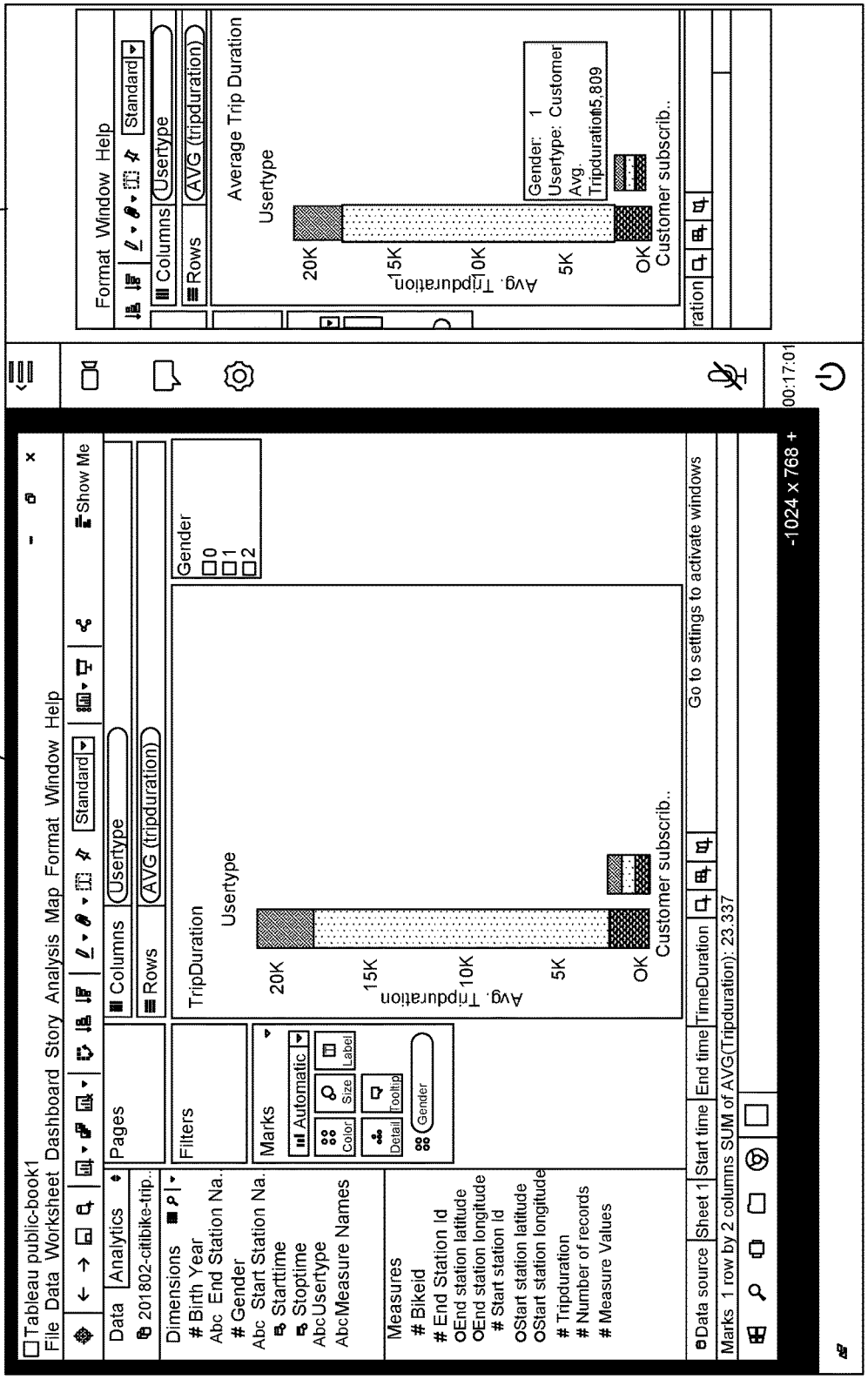
FIG. 28 is a screenshot displaying a Cloud Workspace Task Split View displaying a Cloud Workspace alongside a video task rendered as a split view.

FIG. 28 is a screenshot displaying a Cloud Workspace Task Split View displaying a Cloud Workspace alongside a video task rendered as a split view. Similarly to FIG. 27, FIG. 28 illustrates a cloud workspace 2802 and a content view 2804. In FIG. 28, the content view 2804 illustrates a video task, which may be practiced in the workspace 2802.

Figure 29:
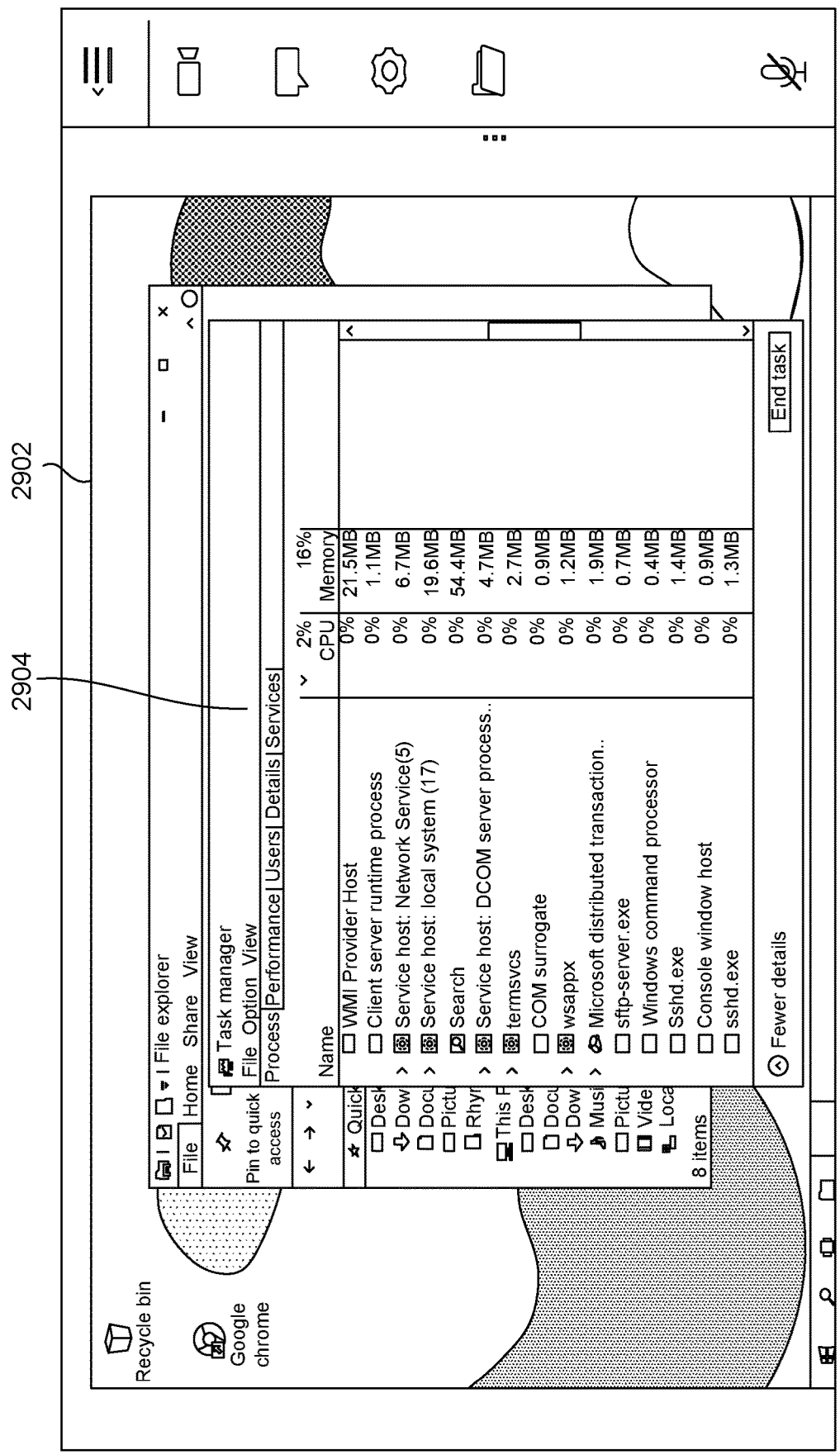
FIG. 29 is a screenshot of a Cloud Workspace Full View displaying a Cloud Workspace rendered in a full view for learner convenience.

FIG. 29 is a screenshot of a Cloud Workspace Full View displaying a Cloud Workspace rendered in a full view for learner convenience. FIG. 29 illustrates that a cloud workspace 2902 may be provided as a full, appropriately configured remote desktop, so that a learner may access folders 2904 or other resources needed to perform a task or learn a skill in a hands-on manner.

Figure 30:
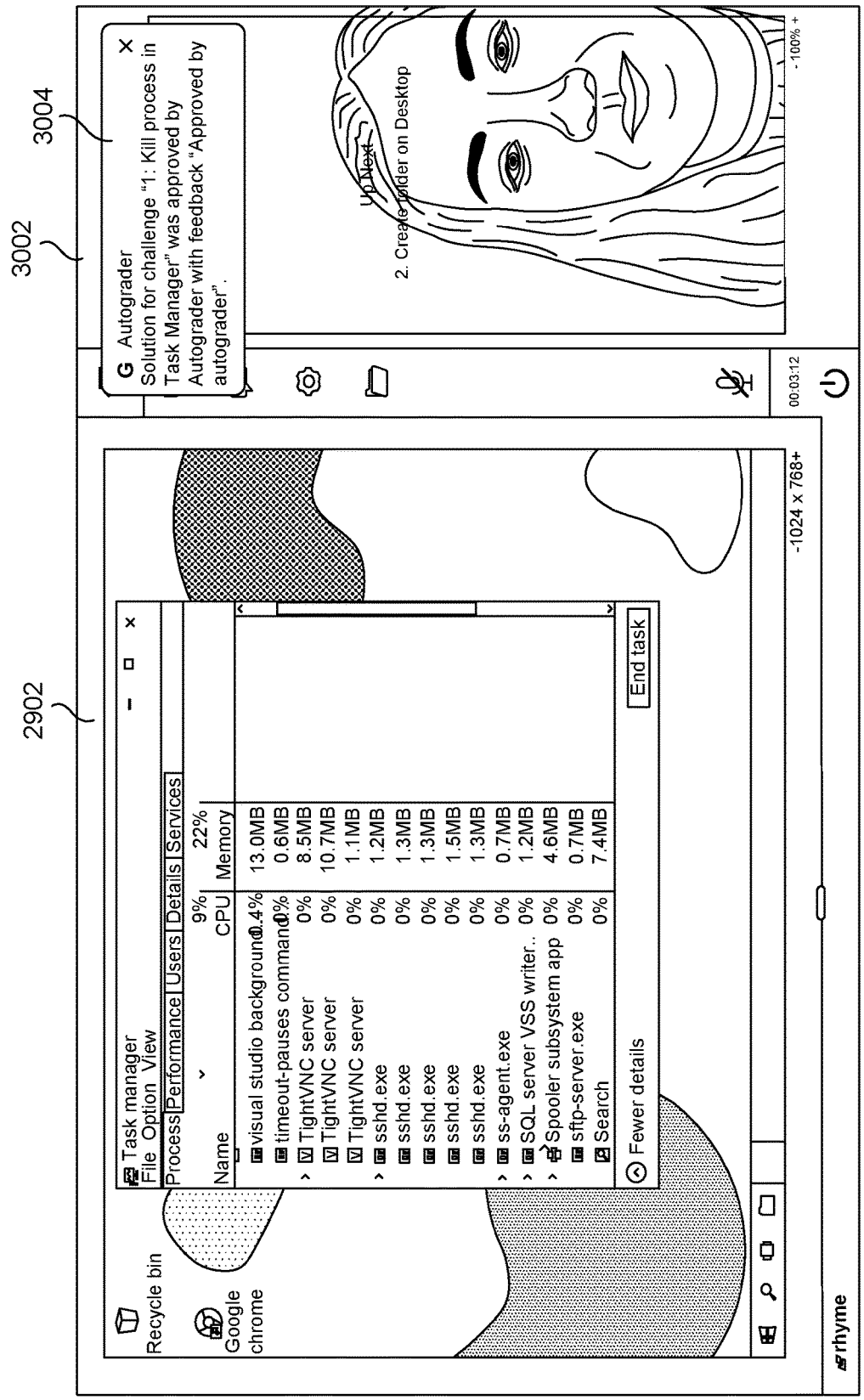
FIG. 30 is a screenshot of a Cloud Workspace Autograder Approved Challenge displaying a rendered notification message that the challenge submission is approved by an autograder.

FIG. 30 is a screenshot of a Cloud Workspace Autograder Approved Challenge displaying a rendered notification message that the challenge submission is approved by an autograder. In the example of FIG. 30, the cloud workspace 2902 of FIG. 29 is displayed in the context of teaching a learner how to kill a process in Task Manager, as shown in window 3004 of content view 3002. In the example of FIG. 30, the autograded task is approved and a subsequent task is about to be initiated.

Figure 31:
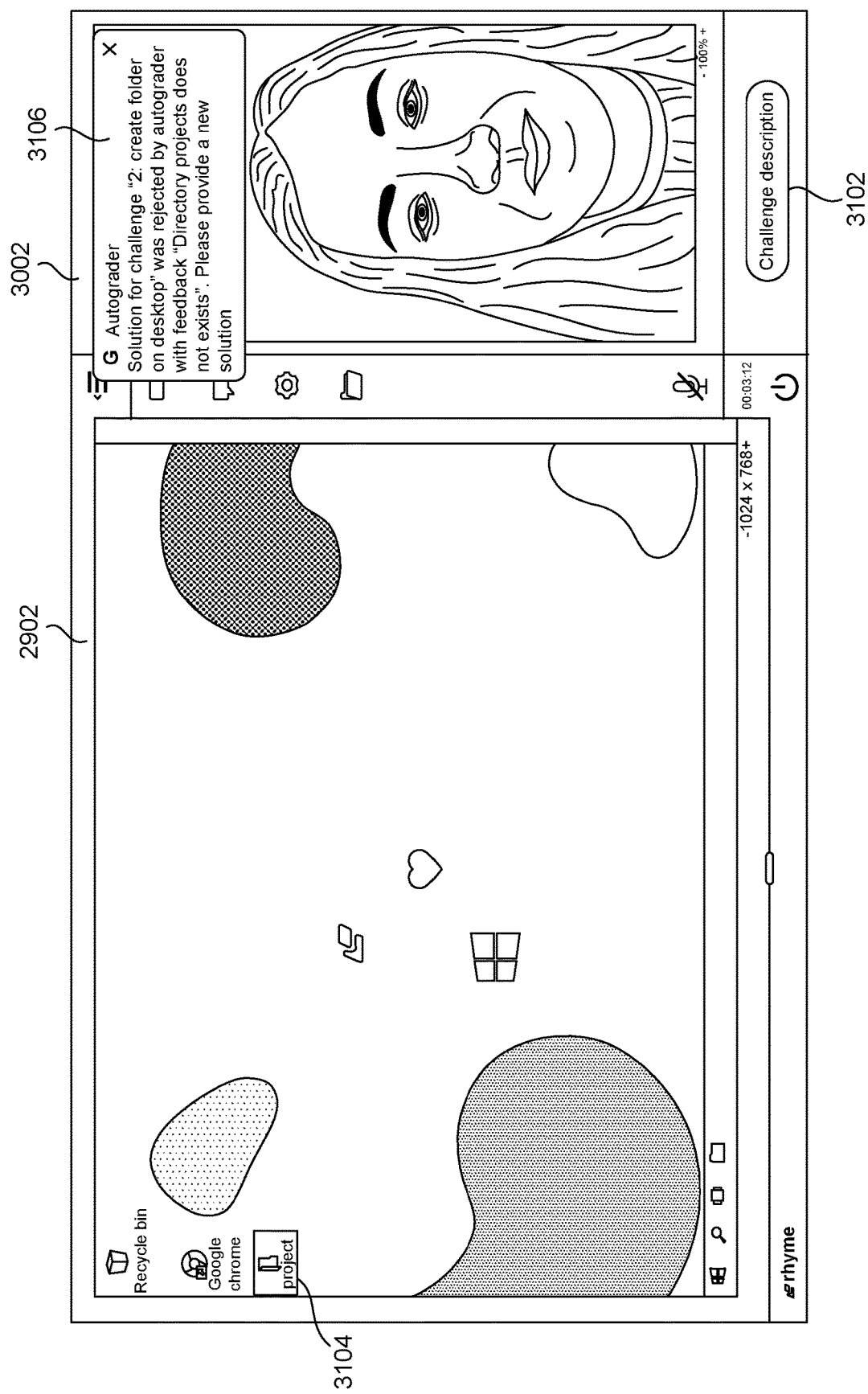
FIG. 31 is a screenshot of a Cloud Workspace Autograder Rejected Challenge displaying a rendered notification message that the challenge submission is rejected by an autograder.

FIG. 31 is a screenshot of a Cloud Workspace Autograder Rejected Challenge displaying a rendered notification message that a subsequent challenge submission is rejected by an autograder. Thus, FIG. 31 illustrates an outcome in which the subsequent task "create folder on desktop" of FIG. 30, as described in challenge description 3102, is not successfully completed, resulting in notification 3106 to that effect.

As described herein, e.g., with respect to FIGS. 1-31, a computer program product, the computer program product being tangibly embodied on a non-transitory computer-readable storage medium, may comprise instructions that, when executed, are configured to cause at least one computer device to provision cloud workspaces able to run a remote desktop protocol used for accessing the cloud workspace by users and sufficient resources to run the software required by the guided project, and allow instructors to preconfigure a cloud workspace with the required materials for the learners to complete the tasks, e.g., installing and configuring software, uploading files, and applying licenses. When executed, the instructions may be further configured to provision preconfigured cloud workspaces to multiple users to be used in a UI combining tasks and a workspace, so that those cloud workspaces can be used in hands-on guided projects, wherein those guided projects include a set of instructions and challenge tasks are used to teach and then evaluate learners' subject comprehension.

The computer program product may generate a UI that includes and executes on the client side, a task player which synchronizes multiple data streams. The task streams may include but not be limited to: a video stream from a cloud workspace, an audio stream from host/learner's microphone, a video stream from host/learner's web camera and/or data streams from host/learner's input devices (keyboard, mouse).

A challenge solution recorder may record multiple data streams simultaneously. These data streams may include but not be limited to: Video stream from a cloud workspace; Audio stream from learner's microphone; Video stream from learner's web camera; Data streams from learner's input devices (keyboard, mouse) when interacting with the cloud desktop may be stored as a binary format (e.g., in a challenge solution store), containing actions with their metadata and timestamp.

Providing these features on the client side enables the system with the capability to serve unlimited numbers of users, because of its distributed nature.

The computer product may be configured to receive challenge solution submissions which include a reference to all data gathered by a challenge solution recorder and stored in a challenge solution storage, and including preparing a record inserted in a database to later be evaluated.

The computer product may be configured to receive feedback related to challenge solution submissions. Possible submitters of that feedback include peers of the learner; the host of the guided project; and an autograding system. The submitters of the feedback can evaluate the learner's comprehension of the subject based on the data gathered by the described challenge solution recorder from claim 2.

The computer product may be configured, with the help of data gathered by a challenge solution recorder, to validate the authorship of the challenge solution by comparing one or more data streams with already known such data streams from the user.

The computer program product may be configured to execute one or more grader rules when a feedback is received. Based on those grader rules the challenge solution may be evaluated and its record in the database may be updated.

A computer program product may be tangibly embodied on a non-transitory computer-readable storage medium and may comprise instructions that, when executed, are configured to cause at least one computing device to provision cloud workspaces able to run a remote desktop protocol used for accessing the cloud workspace by users and sufficient resources to run the software required by the guided project. When executed, the instructions may allow instructors to preconfigure a cloud workspace with the required materials for the learners to complete the tasks, e.g., installing and configuring software, uploading files, and applying for licenses. When executed, the instructions may provision preconfigured cloud workspaces to multiple users to be used in a UI combining tasks and a workspace so that those cloud workspaces can be used in hands-on guided projects, wherein those guided projects a set of instructions and challenge tasks are used to teach and then evaluating learners' subject comprehension.

The computer program product may generate a UI that includes and executes on the client-side a task player that synchronizes multiple data streams, including but not limited to: the video stream from a cloud workspace, audio stream from host/learner's microphone, the video stream from host/learner's web camera, and data streams from host/learner's input devices (keyboard, mouse). The UI may further include and execute on the client-side a user data input recorder that records multiple data streams simultaneously. These data streams may include but not be limited to: the video stream from a cloud workspace; audio stream from learner's microphone; the video stream from the learner's web camera; data streams from learner's input devices (keyboard, mouse) when interacting with the cloud desktop stored as a binary containing actions with their metadata and a timestamp; any file operations (creation, modifications, content changes, and deletions) on the cloud workspace; any configuration changes on the cloud workspace; any processes' creation, state modifications or deletions; any cloud workspace replacements on both host and learner sides. Executing all these on both the client-side and the cloud workspace side provides the system with a capability to serve unlimited numbers of users because of its distributed nature. Those streams may be stored in a binary and/or text format in the challenge solution store.

The computer product may be configured to receive autograding submissions which include a reference to all data gathered by the recorders described above and stored in an autograding submission storage, and to prepare a record inserted in persistent storage to later be evaluated.

The computer product may be configured to communicate with an autograding system which can be either: part of software installed on the cloud workspace and able to communicate with the computer product, or hosted on an external service provider and provide a communication channel with the computer product.

The computer product may be configured to establish a communication protocol for exchanging data with the autograding system.

The computer product may be configured to verify the identity of the autograding system through but not limited to: security tokens signed by the computer product, exchanged by a secured communication channel; whitelisting of identities of autograding systems; and verifying the digital signature of the autograding system in case it is hosted as part of the cloud workspace The computer product may be configured to receive feedback related to those autograding submissions from the autograder systems. The feedback from the autograder system may be sent in the format of the established protocol and verified by any of the methods described herein, or other suitable methods.

The computer product may be configured to process the received feedback and store both the original and the processed data on persistent storage.

The computer product may be configured to send the processed data to the learner as processed autograder feedback.

Further, a computer program product may be tangibly embodied on a non-transitory computer-readable storage medium and comprise instructions that, when executed, are configured to cause at least one computing device to provision cloud workspaces able to run a remote desktop protocol used for accessing the cloud workspace by users and sufficient resources to run the software required by the guided project. The instructions, when executed, may be further configured to allow instructors to preconfigure a cloud workspace with the required materials for the learners to complete the tasks, e.g., installing and configuring software, uploading files, and applying for licenses. The instructions, when executed, may be further configured to provision preconfigured cloud workspaces to multiple users to be used in a UI combining tasks and a workspace so that those cloud workspaces can be used in hands-on guided projects, wherein those guided projects a set of instructions and challenge tasks are used to teach and then evaluating learners' subject comprehension.

The computer program product may be configured to generate a UI that executes on the client-side.

The computer program product may be configured to communicate with a cloud workspace provider using provider's protocol, to create isolated network spaces in cloud workspace provider (where isolated network space can restrict access from and to public internet), create public network spaces in the cloud workspace provider, launch cloud workspaces in the cloud workspace provider with required configuration parameters, and shut-down previously launched cloud workspaces. The computer program product may be configured to receive state updates of cloud workspaces from cloud workspace provider, request current state of cloud workspaces from cloud workspace provider, and instantiate channel to access cloud workspaces using remote desktop protocol, channel is accessible over public network and secured with credentials.

The computer program product may be configured to a receive task query requesting list of tasks that should be completed by user, read the requested tasks from task database, and return a task query response, including requested tasks.

The computer program product may be configured to generate a UI that executes on the client-side and includes a stream synchronizer that receives input from client's device including: mouse input, keyboard input, video stream from web camera, and audio stream from microphone. A cloud workspace controller, using the described connection channel, may receive a video stream from the cloud workspace, send mouse and keyboard input that was recorded using stream synchronizer. A cloud desktop renderer, may be configured to display video from the cloud workspace provided over cloud workspace controller. A task extractor may be configured to make a query to task provider service and receive a list of tasks. A task renderer may be configured to receive a list of tasks from a task extractor and show them to user.

A stream synchronizer may be configured to capture input from a client's device. A cloud workspace controller, using a suitable connection channel, may be configured to capture a video stream from the cloud workspace, and mouse and keyboard input, that were recorded using stream synchronizer.

The computer program product may be configured to generate a UI that executes on the client-side and includes a cloud desktop renderer that shows video stream received from cloud workspace controller, and an input stream synchronizer that instantiates communication channels including a content communication channel, and a notification communication channel.

A task player may synchronize multiple data streams, including but not limited to: the video stream from a cloud workspace, the audio stream from host/learner's microphone; and the video stream from host/learner's web camera.

Data streams recorded from a host/learner's input devices may be recorded by a user data input recorder that records multiple data streams simultaneously, and sends the results to server-side. These data streams include but are not limited to: audio stream from learner's microphone, and the video stream from the learner's web camera.

Any file operations (creation, modifications, content changes, and deletions) on the cloud workspace may also be captured. Any processes' creation, state modifications or deletions may also be captured. Any configuration changes on the cloud workspace, or any cloud workspace replacements on both host and learner sides, may also be captured and utilized.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
provide a graphical user interface configured to access and display a cloud workspace from a cloud provider together with rendered content from a learning platform, the rendered content instructing a task to be performed in the cloud workspace using hardware resources of the at least one computing device;
record, within the cloud workspace, input data keystreams corresponding to the use of the hardware resources while performing the task, synchronized with task data of the task being performed within the cloud workspace;
provide the recorded keystreams and the task data to an autograder configured to compare the recorded keystreams and task data with a solution to the task obtained from the learning platform, to thereby obtain feedback regarding correctness of the task performed relative to the solution; and
render the feedback within the graphical user interface.

2. The computer program product of claim 1, wherein the instructions are further configured to cause the at least one computing device to:
provide the cloud workspace as a remote desktop within the graphical user interface, the remote desktop being pre-configured with resources to perform the task.

3. The computer program product of claim 1, wherein the instructions are further configured to cause the at least one computing device to:
synchronize the input data keystreams with the task data at the at least one computing device, wherein the task data includes video streamed within the cloud workspace.

4. The computer program product of claim 1, wherein the instructions are further configured to cause the at least one computing device to:
provide the recorded keystreams and the task data to the autograder, wherein the autograder is implemented at the cloud provider.

5. The computer program product of claim 1, wherein the instructions are further configured to cause the at least one computing device to:
provide the recorded keystreams and the task data to the autograder, wherein the autograder is implemented externally to the cloud provider and the learning platform.

6. The computer program product of claim 1, wherein the instructions are further configured to cause the at least one computing device to:
provide the recorded keystreams and the task data to the autograder in at least one file in which the input data keystreams are identified as user input and the task data is identified as being associated with the solution.

7. The computer program product of claim 6, wherein the at least one file includes a JavaScript Object Notation (JSON) file.

8. The computer program product of claim 1, wherein the instructions are further configured to cause the at least one computing device to:
synchronize the input data keystreams and the task data with the rendered content.

9. The computer program product of claim 1, wherein the instructions are further configured to cause the at least one computing device to:
provide the recorded keystreams and the task data to an autograder control service that is configured to package the recorded keystreams and the task data for submission to the autograder from among a plurality of compatible autograders.

10. The computer program product of claim 1, wherein the instructions are further configured to cause the at least one computing device to:
render the feedback within the cloud workspace within the graphical user interface.

11. A computer-implemented method, the method comprising:
providing a graphical user interface configured to access and display a cloud workspace from a cloud provider together with rendered content from a learning platform, the rendered content instructing a task to be performed in the cloud workspace using hardware resources of at least one computing device;
recording, within the cloud workspace, input data keystreams corresponding to the use of the hardware resources while performing the task, synchronized with task data of the task being performed within the cloud workspace;
providing the recorded keystreams and the task data to an autograder configured to compare the recorded keystreams and task data with a solution to the task obtained from the learning platform, to thereby obtain feedback regarding correctness of the task performed relative to the solution; and
rendering the feedback within the graphical user interface.

12. The method of claim 11, further comprising:
providing the cloud workspace as a remote desktop within the graphical user interface, the remote desktop being pre-configured with resources to perform the task.

13. The method of claim 11, further comprising:
synchronizing the input data keystreams with the task data at the at least one computing device, wherein the task data includes video streamed within the cloud workspace.

14. The method of claim 11, further comprising:
providing the recorded keystreams and the task data to the autograder in at least one file in which the input data keystreams are identified as user input and the task data is identified as being associated with the solution.

15. The method of claim 11, further comprising:
synchronizing the input data keystreams and the task data with the rendered content.

16. The method of claim 11, further comprising:
providing the recorded keystreams and the task data to an autograder control service that is configured to package the recorded keystreams and the task data for submission to the autograder from among a plurality of compatible autograders.

17. A system comprising:
at least one memory including instructions; and
at least one processor that is operably coupled to the at least one memory and that is arranged and configured to execute instructions that, when executed, cause the at least one processor to:
provide a graphical user interface configured to access and display a cloud workspace from a cloud provider together with rendered content from a learning platform, the rendered content instructing a task to be performed in the cloud workspace using hardware resources of at least one computing device;
record, within the cloud workspace, input data keystreams corresponding to the use of the hardware resources while performing the task, synchronized with task data of the task being performed within the cloud workspace;
provide the recorded keystreams and the task data to an autograder configured to compare the recorded keystreams and task data with a solution to the task obtained from the learning platform, to thereby obtain feedback regarding correctness of the task performed relative to the solution; and
render the feedback within the cloud workspace.

18. The system of claim 17, wherein the instructions, when executed, are further configured to cause the at least one processor to:
provide the cloud workspace as a remote desktop within the graphical user interface, the remote desktop being pre-configured with resources to perform the task.

19. The system of claim 17, wherein the instructions, when executed, are further configured to cause the at least one processor to:
synchronize the input data keystreams with the task data at the at least one computing device, wherein the task data includes video streamed within the cloud workspace.

20. The system of claim 17, wherein the instructions, when executed, are further configured to cause the at least one processor to:
provide the recorded keystreams and the task data to an autograder control service that is configured to package the recorded keystreams and the task data for submission to the autograder from among a plurality of compatible autograders.

21. The computer program product of claim 1, wherein each keystream includes a sequence of keyboard key presses, cursor moves, and clicks made during the use of the hardware resources while performing the task, and the associated timestamps with the keyboard key presses, cursor moves, and clicks in the sequence.

22. The computer program product of claim 1, wherein the hardware resources include a microphone and wherein the instructions, when executed by the at least one computing device, are further configured to cause the at least one computing device to:

record input audio data from the microphone while the task is being performed within the cloud workspace; and provide the recorded input audio data with the keystreams and the task data to the autograder configured to compare the recorded input audio data and the keystreams and task data with a solution to the task obtained from the learning platform, to thereby obtain the feedback regarding correctness of the task performed relative to the solution.

* * * * *